(12) United States Patent
Yorkston et al.

(10) Patent No.: US 7,834,321 B2
(45) Date of Patent: Nov. 16, 2010

(54) APPARATUS FOR ASYMMETRIC DUAL-SCREEN DIGITAL RADIOGRAPHY

(75) Inventors: John Yorkston, Penfield, NY (US); Kwok-Leung Yip, Webster, NY (US); Timothy J. Wojcik, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 110 days.

(21) Appl. No.: 11/487,539

(22) Filed: Jul. 14, 2006

(65) Prior Publication Data

US 2008/0011960 A1    Jan. 17, 2008

(51) Int. Cl.
*H01L 27/146* (2006.01)
(52) U.S. Cl. .................................. 250/370.09
(58) Field of Classification Search .......... 250/370.01–370.15; 378/98.8
See application file for complete search history.

(56) References Cited

U.S. PATENT DOCUMENTS

| | | | |
|---|---|---|---|
| 2,254,033 A * | 8/1941 | Fitzgerald | .................. 430/308 |
| 4,356,398 A | 10/1982 | Komaki et al. | |
| 4,737,641 A | 4/1988 | Lange et al. | |
| 4,855,598 A | 8/1989 | Ohgoda et al. | |
| 4,896,037 A | 1/1990 | Shimura et al. | |
| 4,900,652 A | 2/1990 | Dickerson et al. | |
| 5,021,327 A | 6/1991 | Bunch et al. | |
| 5,108,881 A * | 4/1992 | Dickerson et al. | ........... 430/502 |
| 5,138,167 A * | 8/1992 | Barnes | .................. 250/370.01 |
| 5,221,843 A * | 6/1993 | Alvarez | ...................... 250/583 |
| 5,237,176 A | 8/1993 | Ito | |
| 5,262,649 A * | 11/1993 | Antonuk et al. | ........ 250/370.09 |
| 5,402,338 A | 3/1995 | Ito | |
| 5,650,626 A | 7/1997 | Trauernicht et al. | |
| 5,753,921 A | 5/1998 | Trauernicht et al. | |
| 5,825,032 A | 10/1998 | Nonaka et al. | |
| 6,016,356 A | 1/2000 | Ito et al. | |
| 6,167,110 A | 12/2000 | Possin et al. | |
| 6,285,740 B1 * | 9/2001 | Seely et al. | ................. 378/98.9 |
| 7,263,165 B2 * | 8/2007 | Ghelmansarai | ............ 378/98.8 |
| 2002/0070365 A1 | 6/2002 | Karellas | |

(Continued)

OTHER PUBLICATIONS

Antonuk et al., "Thin-Film, Flat-Panel, Composite Imagers for Projection and Tomographic Imaging", Sep. 1994, IEEE, Transactions on Medical Imaging, vol. 13, No. 3, pp. 482-490.*

(Continued)

*Primary Examiner*—David P Porta
*Assistant Examiner*—Kiho Kim

(57) ABSTRACT

A radiographic imaging apparatus for taking X-ray images of an object includes a front panel and back panel. The panels have substrates, arrays of signal sensing elements and readout devices, and passivation layers. The front and back panels have scintillating phosphor layers responsive to X-rays passing through an object produce light which illuminates the signal sensing elements to provide signals representing X-ray images. The X-ray apparatus has means for combining the signals of the X-ray images to produce a composite X-ray image. Furthermore, the composition and thickness of the scintillating phosphor layers are selected, relative to each other, to improve the diagnostic efficacy of the composite X-ray image. Alternatively, a radiographic imaging apparatus has a single panel having arrays of signal sensing elements and readout devices and scintillating phosphor layers that are disposed on both sides of a single substrate.

8 Claims, 18 Drawing Sheets

U.S. PATENT DOCUMENTS

2004/0155198 A1* 8/2004 Miyata et al. .......... 250/370.11
2006/0151708 A1* 7/2006 Bani-Hashemi et al. ................ 250/370.11

OTHER PUBLICATIONS

P. C. Bunch, "Performance characteristics of asymmetric zero-crossover screen-film system," Proc. SPIE 1653, 46 (1992).

C. C. Shaw, T. P. Wang, D. S. Breitenstein, and D. Gur, "Improvement of signal-to-noise and contrast-to-noise ratios in dual-screen computed radiography," Med. Phys. 24, 1293 (1997).

C. C. Shaw, X. Liu, S. Chardon, and J. M. Herron, "Frequency dependent DQE in dual-screen CR imaging," Proc. SPIE 3336, 684 (1998).

J. A. Rowlands and J. Yorkston, "Flat panel detectors for digital radiography," In Handbook of Medical Imaging, vol. 1, Physics and Psychophysics, Edited by J. Beutel, H. L. Kundel, and R. L. Van Metter (SPIE Press, Bellingham, WA, 2000), pp. 223-328.

R. A. Kruger, J. D. Armstrong, J. A. Sorenson, and L. T. Niklason, "Dual energy film subtraction technique for detecting calcification in solitary pulmonary nodules," Radiology 140, 213 (1981).

J.-T. Ho and R. A. Kruger, "Dual energy film subtraction technique for bone contrast suppression in chest radiography," Proc. SPIE 914, 531 (1988).

J. M. Sabol, G. B. Avinash, F. Nicolas, B. Claus, J. Zhao, and J. T. Dobblins III, "The development and characterization of a dual-energy subtraction imaging system for chest radiography based on CsI:T1 amorphous silicon flat-panel technology," Proc. SPIE 4320, 399 (2001).

R. Guillemaud, C. Robert-Coutant, M. Darboux, J.-J. Gageliu, and J.-M. Dinten, "Evaluation of dual-energy radiography with a digital x-ray detector," Proc. SPIE 4320, 469 (2001).

J. C. Lapp, "Glass substrates for AMLCD applications: properties and implications," Technical Information Paper 101, Corning Inc., 1997.

J. C. Lapp, "AMLCD substrates trends in technology," Technical Information Paper 102, Corning Inc., 2003.

Schott North America Inc. web site: www.us.schott.com.

J. M. Mace, "Polyester film as a substrate for electronic imaging," IS&T's 46th Annual Conference, p. 371, 1993.

W. Ito, K. Shimura, N. Nakajima, H. Ishida, and H. Kato, "Improvement of detection in computed radiography by new single-exposure dual-energy subtraction," J. of Dig. Img. 6, 42, (1993).

Thomas E. Hartman, "Dual-Energy Radiography," Seminars in Roentgenology, vol. 32, No. 1, Jan. 1, 1997, pp. 45-49.

Stewart et al., "Single-exposure dual-energy computed radiography," Medical Physics, AIP, vol. 17, No. 5, Sep. 1, 1990, pp. 866-875.

* cited by examiner

APPARATUS FOR ASYMMETRIC DUAL-SCREEN DIGITAL RADIOGRAPHY

FIELD OF THE INVENTION

The invention relates generally to digital radiography, and in particular relates to the use of a plurality of asymmetric screens in digital radiographic flat-panel imagers to improve image quality.

BACKGROUND OF THE INVENTION

Generally, medical X-ray detectors employing a scintillating phosphor screen to absorb X-rays and produce light suffer the loss of spatial resolution due to lateral light diffusion in the phosphor screen. To reduce lateral light diffusion and maintain acceptable spatial resolution, the phosphor screens must be made sufficiently thin.

The spatial resolution and X-ray detection ability of an imaging apparatus are often characterized by the modulation transfer function (MTF) and X-ray absorption efficiency, respectively. Thin phosphor screens produce better MTF at the expense of reduced X-ray absorption. Usually, the coating density and the thickness of the phosphor screen are used in the design tradeoff between spatial resolution and X-ray absorption efficiency.

For example, the Lanex Fine and the Lanex Fast Back screens are two typical commercial screens manufactured by Eastman Kodak Co. Both are made of $Gd_2O_2S(Tb)$ phosphor. The Lanex Fast Back screen is thicker, absorbs X-rays more efficiently, but has lower resolution than the Lanex Fine screen. On the other hand, the Lanex Fine screen is thinner than the Lanex Fast Back screen, absorbs X-rays less efficiently, but has higher resolution. The coating density of the Lanex Fine and the Lanex Fast Back screens are 34 $mg/cm^2$ and 133 $mg/cm^2$, respectively. The Lanex Fine and the Lanex Fast Back screens have an X-ray absorption efficiency of 24% and 63% (for 80 kVp, with tungsten target, 2.5-mm Al inherent filtration, and filtered by 0.5-mm Cu) and an MTF value of 0.26 and 0.04 at 5 c/mm, respectively.

In order to improve X-ray absorption and maintain spatial resolution, the use of double screens in conjunction with a double-emulsion film has been incorporated in conventional screen-film (SF) radiographic apparatus. Similarly, the dual-screen technique has also been used in computed radiography (CR) to improve the X-ray absorption efficiency. In the digital CR apparatus, a storage phosphor screen is used in place of the prompt emitting phosphor screen employed in the SF apparatus. No film is needed. Upon X-ray exposure, the storage phosphor screen stores a latent image in the form of trapped charge that is subsequently read out, typically by a scanning laser beam, to produce a digital radiographic image.

Recently, digital flat panel X-ray imagers based upon active matrix thin film electronics have become a promising technology for applications such as diagnostic radiology and digital mammography. There are two types of X-ray energy conversion methods used in digital radiography (DR), namely, the direct and indirect method. In the direct method, the X-rays absorbed in a photoconductor are directly transduced into a charge signal, stored on the pixel electrodes on an active matrix array (AMA) and read out using thin film transistors (TFTs) to produce a digital image. Amorphous selenium (a-Se) is usually used as the photoconductor. In the indirect method, a single phosphor screen is used to absorb X-rays and the resultant light photons are detected by an AMA with a single photodiode (PD) and a TFT switch at each pixel. The photodiode absorbs the light given off by the phosphor in proportion to the X-ray energy absorbed. The stored charge is then read out, like the direct method, using the TFT switch.

Hydrogenated amorphous silicon (a-Si:H) is commonly used to form the photodiode and the TFT switch. FIG. 1A shows a cross-section (not to scale) of single imaging pixel 10 in a prior art a-Si based flat panel imager. Each imaging pixel 10 has, as shown in FIG. 1B, photodiode 70 and TFT switch 71. A layer of X-ray converter (e.g., luminescent phosphor screen 12) is coupled to the photodiode-TFT array. Photodiode 70 comprises the following layers: passivation layer 14, indium tin oxide layer 16, p-doped a-Si layer 18, intrinsic a-Si:H layer 20, n-doped a-Si layer 22, metal layer 24, dielectric layer 26, and glass substrate 28. X-ray photon path 30 and visible light photon path 32 are also shown in FIG. 1A. When a single X-ray is absorbed by the phosphor, a large number of light photons are emitted isotropically. Only a fraction of the emitted light reaches the photodiode and gets detected.

FIG. 1B shows a block diagram of the flat panel imager 80, which consists of a sensor array 81. The a-Si based sensor array consists of m data lines 84 and n gate lines 83. Each pixel consists of a-Si photodiode 70 connected to thin film transistor (TFT) 71. Each photodiode 70 is connected to common bias line 85 and the drain (D) of its associated TFT. Bias lines 85 carry bias voltages applied to photodiodes 70 and TFTs 71. TFTs 71 are controlled by their associated gate lines 83 and when addressed, transfer stored charge onto data lines 84. During readout, a gate line is turned on for a finite time (approximately 10 to 100 µs), allowing sufficient time for TFTs 71 on that row to transfer their pixel charges to all the m data lines. Data lines 84 are connected to charge amplifiers 86, which operate in parallel. In general, charge amplifiers 86 are divided into a number of groups, with each group typically having 32, 64, or 128 charge amplifiers. The associated charge amplifiers in each group detect the image signals, and clock the signals onto multiplexer 87, whence they are multiplexed and subsequently digitized by an analog to digital converter 88. The digital image data are then transferred over a coupling to memory 93. Gate lines 83 are turned on in sequence, requiring approximately a few seconds for an entire frame to be scanned. Additional image correction and image processing are performed by computer 90, and the resulting image is displayed on monitor 91 or is printed onto media by printer 92.

To reduce electronic noise as much as possible, a correlated double sampling (CDS) circuitry 89 may be disposed between each charge amplifier 86 and multiplexer 87. In the readout sequence of image signals, the charge signal on each data line 84 is sampled before and after the detection of signal charge by charge amplifier 86, and the resulting difference becomes the signal measured. In this sampling scheme, the background noise is reduced from the image signal. Double correlated sampling circuits 89 are preferable for flat panel imager 80, but are not needed for the imager to function. The synchronous operations of the various units of flat panel imager 80, namely, gate drivers 82, charge amplifiers 86, correlated double sampling circuits 89, and analog-to-digital converters 88, which provide the necessary timing, biasing, switching, sampling, scanning, and data readout functions, are controlled by computer 90 via control logic unit 94.

The operation of the a-Si based indirect flat panel imager is known by those skilled in the art, and thus only a brief description is given here. Incident X-ray photons are converted to optical photons in the phosphor screen 12, and these optical photons are subsequently converted to electron-hole pairs within the a-Si:H n-i-p photodiodes 70. In general, a reverse bias voltage is applied to the bias lines 85 to create an electric field (and hence a depletion region) across the photodiodes and enhance charge collection efficiency. The pixel charge capacity of the photodiodes is determined by the product of the bias voltage and the photodiode capacitance. The image signal is integrated by the photodiodes while the associated TFTs 71 are held in a non-conducting ("off") state. This is accomplished by maintaining the gate lines 83 at a negative voltage. The array is read out by sequentially switching rows of TFTs to a conducting state by means of TFT gate control circuitry. When a row of pixels is switched to a conducting ("on") state by applying a positive voltage to the corresponding gate line 83, charge from those pixels is transferred along data lines 84 and integrated by external charge-sensitive amplifiers 86. The row is then switched back to a non-conducting state, and the process is repeated for each row until the entire array has been read out. The signal outputs from external charge-sensitive amplifiers 86 are transferred to analog-to-digital converter (ADC) 88 by parallel-to-serial multiplexer 87, subsequently yielding a digital image. Alternatively, individual ADCs can be located at each signal output from charge amplifier 86. Multiplexer 87 could thus be removed from flat panel imager 80. The flat panel imager is capable of both single-shot (radiographic) and continuous (fluoroscopic) image acquisition.

Another imaging technique, known as dual energy subtraction imaging, has been used to reduce the impact of anatomic background on disease detection in chest radiography and angiography. This method is based on the different energy-dependent absorption characteristics of bone and soft tissue. In general, two raw images are produced. One is a low-energy and high-contrast image, and the other is a high-energy and low-contrast image. By taking nonlinear combinations of these two images, pure bone and soft-tissue images can be obtained. This imaging technique would improve diagnosis of pathology and delineation of anatomy.

The dual energy subtraction imaging has two general approaches: dual-exposure technique and single-exposure technique. In the dual-exposure technique, two different images are obtained from a detector by making two exposures at two different X-ray tube voltage settings. Since a double exposure of the patient must be performed, and the switching of the X-ray tube voltage must take a finite time, the double exposure technique would be sensitive to patient motion artifacts and misregistration between the two images. In the single-exposure technique, in which an energy filter is sandwiched between two detectors to attenuate the low-energy component, two different images are simultaneously obtained by making only one exposure of the patient. The single-exposure technique has the advantages of reducing patient motion misregistration artifacts and reducing X-ray dosage. The dual energy subtraction imaging has been implemented in both the screen-film and computed radiography apparatus with either the single-exposure or the dual-exposure technique.

Prior art screen-film apparatus 40 as shown in FIG. 2 combines asymmetric screens (front screen 44 and back screen 56) with a zero-crossover film coated with asymmetric emulsions (i.e., there is no light emitted by each screen crossing the film support to expose the emulsion on the other side) as shown in FIG. 2. X-ray photon path 42 illustrates the incoming path of X-rays to screen-film apparatus 40. Anti-crossover layers 48 and 52 (light absorbing layer) are deposited between each emulsion layer (front emulsion layer 46 and back emulsion layer 54) and film support layer 50. Relatively slow, high-resolution front screen 44 exposes high-contrast front emulsion layer 46. The combination of front screen 44 and front emulsion 46 is primarily responsible for imaging the lung fields. In addition, fast, standard-resolution back screen 56, which absorbs X-ray quanta with high efficiency, exposes wide-latitude back emulsion 54, and is primarily responsible for imaging the low-exposure mediastinum and retrocardiac regions. As a result, both the lung field and the mediastinum areas are clearly recorded. This screen-film imaging apparatus is primarily an analog (not digital) apparatus in which the exposed film must be chemically processed to form the final image. It can take a few minutes from exposure to image display. The apparatus has a narrow dynamic range and thus a narrow exposure latitude. The image cannot be digitally processed for image enhancement, displayed on monitor, stored in computer or digital storage devices, and transmitted wirelessly or via the Internet or other communications network.

Turning to FIG. 3, prior art dual-screen computed radiography (CR) imaging apparatus 60 has been used to improve the X-ray absorption and thus the overall image signal-to-noise ratio (SNR) and the contrast-to-noise ratio (CNR). With this technique, two CR screens (front screen 62 and back screen 64) are placed in a cassette for exposure by X-rays 66 through patient 68, as shown in FIG. 3. Exposed screens 62 and 64 are separately scanned with a laser scanner to form a front image and a back image which are then superimposed in various ways to optimize the quality of the final image.

For example, in chest imaging one can use a high-resolution (HR) screen and a standard-resolution (ST) screen to improve the MTF without compromising on the total X-ray absorption efficiency, as compared to the use of a ST screen alone. The use of a ST screen in the back of a HR screen does not degrade the high frequency performance of the HR screen. Instead, it enhances the image quality in the low to medium frequency range and preserve the quality in the high frequency range. As a result, this technique allows high-resolution details to be imaged (e.g., pneumothorax or rib fractures).

One prior art multi-screen CR apparatus has a plurality of stimulable storage phosphor plates that are exposed to X-rays to record a radiographic latent image of a subject viewed from the same direction. The image signals read out from the stimulable phosphor plates are superimposed to obtain an averaged image signal and to reduce the various noises associated with each component of the CR imaging apparatus. The averaged image signal is then subjected to a gradation process for enhancing the contrast of the image. As a result, the diagnostic efficiency and accuracy can be markedly improved.

Another prior art dual-screen CR apparatus for producing X-ray images of a subject exposed to an X-ray beam has a storage phosphor plate used for receiving X-ray radiation after passage through the subject. The storage phosphor plate has a substrate having two major faces with a photo-stimulable storage phosphor layer disposed on each face. The two storage layers have different materials or thicknesses. A double readout device is used to read out the radiation signals stored in each storage layer. The double readout device includes two separate sets of readouts apparatus for reading out each of storage layers. Each readout apparatus has a scanning laser beam to excite the storage charges, an optical collector to collect the stimulated light, a photomultiplier tube to convert the stimulated light into an electrical signal. The substrate (such as a metal foil) is impenetrable by the exciting laser beams and the stimulated light so that there will be no crossover of image signals generated in the two storage layers.

Other prior art dual-screen CR apparatus utilize an image superposition method wherein an addition process is carried out on a plurality of image signals representing the two radiation images of a single object recorded by two storage phosphor screens. The image signals corresponding to the picture elements are weighted with predetermined weight factors and then added to form the output image signal. The value of the weight factor with respect to the frequency components, which have a low signal-to-noise ratio, is rendered smaller than the value of the weight factor with respect to the frequency components, which have a higher signal-to-noise ratio, in accordance with the frequency characteristics of each of the image signals.

As a digital imaging technology, the above-mentioned CR-based imaging apparatus possess the desirable digital advantages over the screen-film apparatus. However, the CR apparatus needs a laser scanner to convert the latent x-ray image into the output digital image, and an optical unit to erase the residual image left on the storage phosphor plate from the previous X-ray exposure. This can take about 30 seconds to a few minutes for an image to be displayed.

Other prior art apparatus relate to dual energy subtraction imaging. One prior art dual energy subtraction technique uses a conventional screen-film combination to detect calcification in solitary pulmonary nodules. In this technique, two exposures are used. However, in clinical practice patient motion during the interval between the two radiographic exposures will degrade the subtraction image. Another prior art technique implements a single-exposure technique in dual-energy chest radiography using one X-ray tube voltage and two different screen-film combinations, separated by a copper filtration and loaded into a single cassette. This technique has been used to detect lung nodules by suppressing the bone contrast in chest radiography.

In the above-mentioned techniques using screen-film combinations, the image pair recorded on film has to be first digitized and then processed to produce the bone-free and soft tissue-free images. This would inherently reduce the throughout of the dual-energy radiographic procedure and reduce the image quality due to the image degradations caused by the film digitizer.

One prior art computed radiography system relies on a single-exposure dual energy subtraction imaging technique using scanning laser-stimulated luminescence. This apparatus produces the low-energy image and high-energy image simultaneously. These two original images are the images recorded by the first imaging plate (closer to the patient) and the second imaging plate, respectively. The new image is obtained by the subtraction processing. However, image magnification factor is slightly different between the first imaging plate and the second plate due to the fixed separation between the two plates. Therefore, in areas distant from the center of the X-ray beam, misregistration occurs.

Another prior art dual-exposure dual energy subtraction imaging apparatus with computed radiography uses a filter changer and an imaging plate changer to record a low-energy image and a high-energy image.

Although the above-mentioned dual energy CR apparatus have provided new diagnostic information that is not furnished by the conventional screen-film apparatus, these apparatus have been hampered by poor subtraction effectiveness, workflow inconveniences, and Detective Quantum Efficiency (DQE) limitations of the CR technology.

Recently, the dual-exposure dual energy subtraction imaging has also been implemented in digital flat-panel imaging apparatus based on a CsI:Tl scintillator coupled to an amorphous silicon TFT array or a $Gd_2O_2S$ scintillator coupled to four CCD cameras. Although these dual-exposure based DR apparatus have shown improvements in the detection and characterization of lung diseases, there still are issues such as X-ray tube loading, X-ray dosage on patient, and patient motion artifacts.

As such, there exists a need for extending the application of dual scintillating screens (scintillating phosphor layers) to an indirect digital radiography (DR) apparatus. Moreover, there exists a need for extending the application of dual scintillating screens in an indirect digital radiography (DR) apparatus for the single-exposure dual energy subtraction imaging.

SUMMARY OF THE INVENTION

In one embodiment of the invention, there is provided a radiographic imaging apparatus for taking X-ray images of an object, comprising:

1. A radiographic imaging apparatus for taking X-ray images of an object, comprising:
   (a) a front panel, having:
      (i) a first substrate, having first and second surfaces;
      (ii) a first array of signal sensing elements and readout devices disposed over the first surface or under the second surface of the first substrate;
      (iii) a first passivation layer disposed on the first array of signal sensing elements and readout devices; and
      (iv) a first scintillating phosphor layer having a first thickness disposed over or under the first passivation layer and responsive to X-rays passing through the object to produce light which illuminates the first signal sensing elements to thereby provide signals representing a first X-ray image;
   (b) a back panel, having:
      (i) a second substrate having first and second surfaces;
      (ii) a second array of signal sensing elements and readout devices disposed over the first surface or under the second surface of the second substrate;
      (iii) a second passivation layer disposed on the second array of signal sensing elements and readout devices; and
      (iv) a second scintillating phosphor layer having a second thickness disposed over or under the second passivation layer and responsive to X-rays passing through the object and the front panel to produce light which illuminates the second signal sensing elements to thereby provide signals representing a second X-ray image;
   (c) means for combining the signals of the first and second X-ray images to produce a composite X-ray image; and
   (d) the composition and thickness of the first and second scintillating phosphor layers being selected, relative to each other, to provide an improved detective quantum efficiency.

In another embodiment of the present invention, there is provided a radiographic imaging apparatus for taking X-ray images of an object, comprising:
   (a) a first scintillating phosphor layer having a first thickness responsive to X-rays passing through the object to produce light;
   (b) a first passivation layer disposed under the first scintillating phosphor layer;
   (c) a first array of signal sensing elements and readout devices disposed under the first passivation layer which receives illumination from the first scintillating phosphor layer, wherein the first signal sensing elements provide signals representing a first X-ray image;
   (d) a first crossover reducing layer disposed under the first array of signal sensing elements and readout devices;

(e) a substrate, disposed under the first crossover reducing layer;

(f) a second crossover reducing layer disposed under the substrate;

(g) a second array of signal sensing elements and readout devices disposed under the second crossover reducing layer;

(h) a second passivation layer disposed under the second array of signal sensing elements and readout devices;

(i) a second scintillating phosphor layer disposed under the second passivation layer, having a second thickness responsive to X-rays passing through the object and all the layers above the second scintillating phosphor layer to produce light which illuminates the second signal sensing elements to thereby provide signals representing a second X-ray image;

(j) means for combining the signals of the first and second X-ray images to produce a composite X-ray image; and (k) the composition and thickness of the first and second scintillating phosphor layers being selected, relative to each other, to provide an improved detective quantum efficiency.

ADVANTAGES

The above-described asymmetric dual-screen digital radiography apparatus have various advantages over single-screen digital radiography apparatus. The present invention provides a higher detective quantum efficiency (DQE) which is a key metric for evaluating image quality. The higher MTF of the apparatus of the present invention yield sharper images. The higher X-ray absorption yields higher detector speed. The lower noise levels of the exemplary apparatus of the present invention give less quantum mottle. The higher detective quantum efficiency of the embodiments of the present invention provide higher overall image quality. Furthermore, the use of a pair of asymmetric screens in an indirect DR apparatus significantly eases the conflict in the design of an X-ray phosphor screen to maintain simultaneously both the X-ray absorption (which in general requires a screen with increased thickness) and the spatial resolution (which in general requires a screen with decreased thickness). Moreover, the use of a flexible substrate (e.g., metal foil, plastic sheet, or combinations thereof) for the flat panel imaging apparatus improves the mechanical strength and physical durability of the apparatus, and reduces the X-ray absorption loss due to the substrate.

The proposed single-exposure dual-energy digital radiography apparatus has various advantages over the prior art. There is no switching of the X-ray tube voltage required with such embodiments. There can be a reduction of patient motion misregistration artifacts in images. There can be lower X-ray tube loading, and lower X-ray exposure on the patient. In addition, higher detector performance in spatial resolution and signal-to-noise ratio can yield higher image quality and subsequent improvement in detection and characterization of diseases through dual-energy imaging. Moreover, there can be better integration of dual energy imaging into the current clinical workflow providing higher operation efficiency, without the needs of digitizing the film images (SF apparatus), scanning the imaging plates (CR apparatus), and double exposure on the patient (dual-exposure DR apparatus).

In at least one of the above-identified embodiments of the invention, instead of using two flat panels to capture the radiographic image, a single flat panel having a phosphor screen coated on the front side of the substrate which is thinner than the phosphor screen coated on the back side of the substrate is used in another exemplary embodiment of the present invention. A light blocking layer can be coated on each side of the substrate to minimize the crossover of light emitted in the phosphor screen on one side of the substrate to the photodiode on the other side of the substrate. The two screens are exposed to X-rays simultaneously and the photodiode on the front and back sides of the substrate detect the front and back image respectively. Subsequently, the two images are combined and processed to yield a higher quality image. Since the two images detected by the front and back screens are in mirror image relation to each other, one of the images should be inverted when the image processing is carried out.

BRIEF DESCRIPTION OF THE DRAWINGS

The foregoing and other objects, features, and advantages of the invention will be apparent from the following more particular description of the embodiments of the invention, as illustrated in the accompanying drawings.

DETAILED DESCRIPTION OF THE INVENTION

Figure 1A:
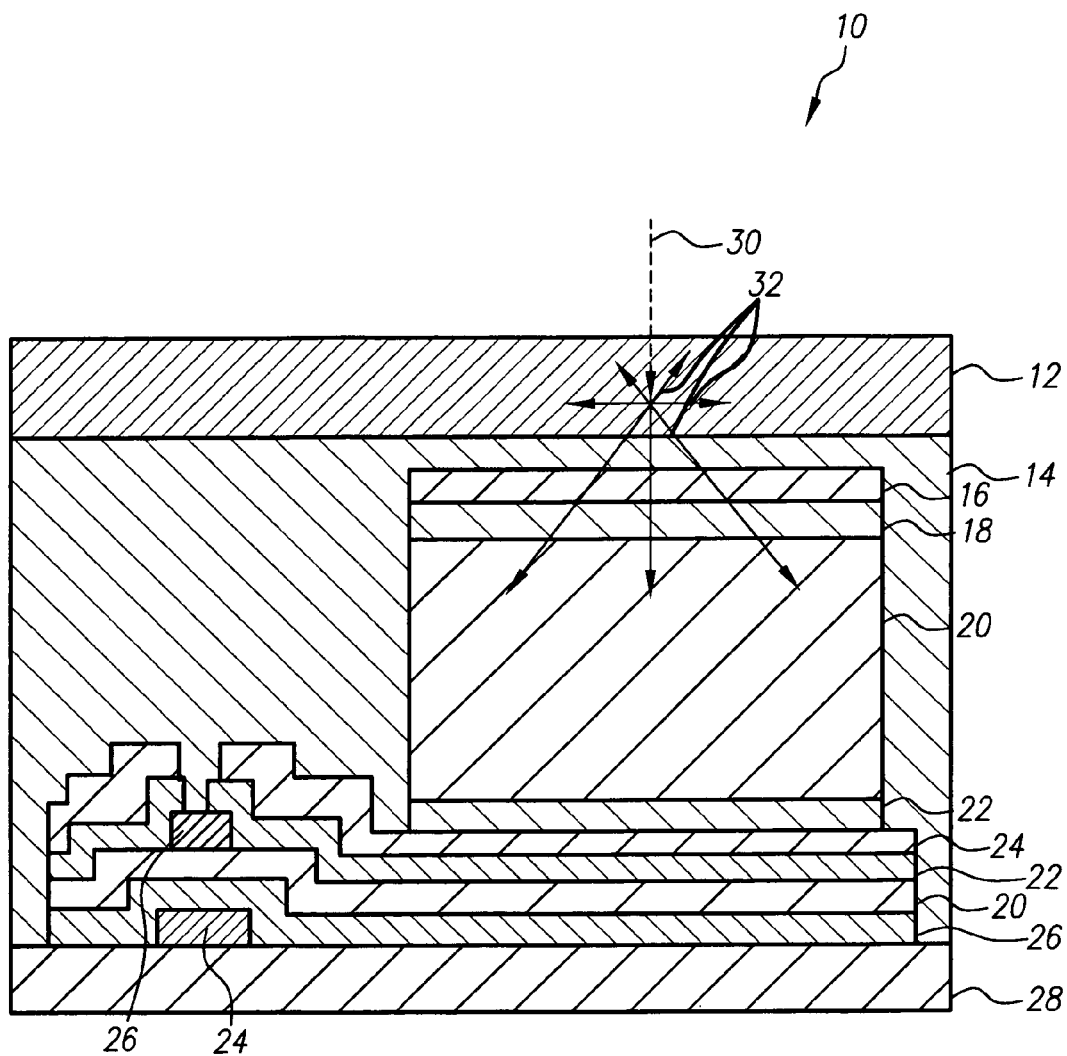
FIG. 1A shows a cross-section view of an imaging pixel in a prior art single-screen a-Si based flat panel imager.

The following is a detailed description of the preferred embodiments of the invention, reference being made to the drawings in which the same reference numerals identify the same elements of structure in each of the several figures.

The present invention is directed to a digital radiography apparatus wherein an X-ray source projects an X-ray beam through an object to produce an X-ray image captured by a detecting member. In particular the present invention is directed to various embodiments related to indirect asymmetric dual-screen DR apparatus and single-exposure dual energy DR apparatus.

Indirect Asymmetric Dual-screen DR Apparatus

FIGS. 4-7 show diagrammatic views of a digital radiography apparatus in various embodiments in accordance with the present invention.

Figure 4:
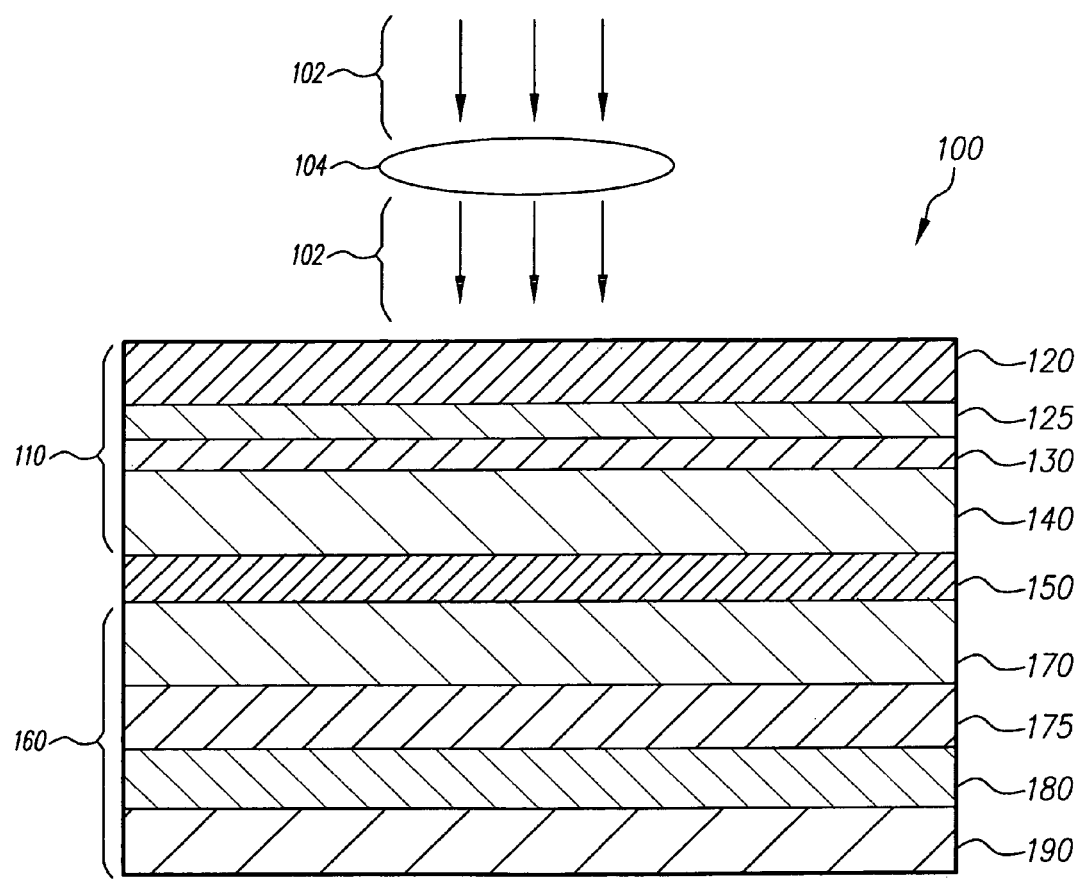
FIG. 4 shows a diagrammatic view of a dual-screen digital radiography flat-panel imager with a light-blocking film in accordance with an exemplary embodiment of the present invention.

A first exemplary embodiment of the invention is illustrated in FIG. 4, where X-rays 102 are directed through object 104 to digital radiography imager 100 form an image. The digital radiography imager 100 uses two flat panel detectors (front panel 110 and back panel 160) to capture and process X-ray 102 in order to form an image. In this particular embodiment, the front panel 110 is in front screen configuration and the back panel 160 is also in front screen configuration. This will be designated the front-front configuration where the term "front screen configuration" relates to the orientation of the individual detectors such that the incident x-rays first impinge on the scintillating phosphor component (e.g., first scintillating layer 120) of the detector, then they impinge on and pass through the array of sensing elements (e.g., first array of signal sensing elements and readout devices 130). Likewise, use will be made of the term "back screen configuration" when the detector component is oriented such that the incident X-rays impinge first on the array of sensing elements then impinge on the scintillating phosphor component. Preferably, the thickness of second scintillating phosphor layer 170 of back panel 160 is greater than or equal to the thickness of first scintillating phosphor layer 120 of front panel 110. Selecting the thickness and composition of the first and second scintillating phosphor layers, relative to each other, provides an improved detective quantum efficiency (see FIG. 16).

The scintillating phosphor layers 120 and 170 can be conventional radiographic intensifying screens. Intensifying screens have a luminescent layer in which prompt emitting phosphor is dispersed as a particulate in a polymeric matrix and have additional layers such as support layers, protective overcoats, and retainers. Suitable prompt emitting phosphors are well known, for example, rare-earth oxysulfides doped with a rare-earth activator. The present invention preferably uses emitting phosphors such as $Gd_2O_2S{:}Tb$, $Gd_2O_2S{:}Eu$, $Gd_2O_3{:}Eu$, $La_2O_2S{:}Tb$, $La_2O_2S$, $Y_2O_2S{:}Tb$, $CsI{:}Tl$, $CsI{:}Na$, $CsBr{:}Tl$, $NaI{:}Tl$, $CaWO_4$, $CaWO_4{:}Tb$, $BaFBr{:}Eu$, $BaFCl{:}Eu$, $BaSO_4{:}Eu$, $BaSrSO_4$, $BaPbSO_4$, $BaAl_{12}O_{19}{:}Mn$, $BaMgAl_{10}O_{17}{:}Eu$, $Zn_2SiO_4{:}Mn$, $(Zn,Cd)S{:}Ag$, $LaOBr$, $LaOBr{:}Tm$, $Lu_2O_2S{:}Eu$, $Lu_2O_2S{:}Tb$, $LuTaO_4$, $HfO_2{:}Ti$, $HfGeO_4{:}Ti$, $YTaO_4$, $YTaO_4{:}Gd$, $YTaO_4{:}Nb$, $Y_2O_3{:}Eu$, $YBO_3{:}Eu$, $YBO_3{:}Tb$, or $(Y,Gd)BO_3{:}Eu$, or combinations thereof. However, any suitable emitting phosphor material, including doped phosphor materials, can be used in any of the embodiments of the present invention described herein. A blend of different phosphors can also be used. The median particle size utilized is generally between about 0.5 µm and about 40 µm. A median particle size of between 1 µm and about 20 µm is preferred for ease of formulation, as well as optimizing properties, such as speed, sharpness and noise.

The scintillating phosphor layers 120 and 170 can be prepared using conventional coating techniques where the phosphor powder is mixed with a solution of a resin binder material and coated by means such as blade coating onto a substrate. The binder can be chosen from a variety of known organic polymers that are transparent to X-rays, stimulating, and emitting light. Binders commonly employed in the art include sodium o-sulfobenzaldehyde acetal of poly(vinyl alcohol); chloro-sulfonated poly(ethylene); a mixture of macromolecular bisphenol poly(carbonates) and copolymers comprising bisphenol carbonates and poly(alkylene oxides); aqueous ethanol soluble nylons; poly(alkyl acrylates and methacrylates) and copolymers of poly(alkyl acrylates and methacrylates with acrylic and methacrylic acid); poly(vinyl butyral); and poly(urethane) elastomers. However, any conventional ratio phosphor to binder can be employed. Generally, thinner phosphor layers and sharper images are realized when a high weight ratio of phosphor to binder is employed. Phosphor-to-binder ratios in the range of about 7:1 to 25:1 are preferable. The intensifying screen is not limited to the use of crystalline phosphors for the X-ray-to-light conversion. For example, a scintillating glass or organic scintillator can be used.

Filter 150 is placed between front panel 110 and back panel 160 to minimize the crossover of light emitted in one panel to the other panel. Filter 150 can minimize the light transmitted between front panel 110 and back panel 160. Preferably, filter 150 minimizes the crossover of light between panels 110 and 160 to be 10 percent or less. In one aspect of this embodiment, filter 150 can be a light blocking film or layer. The light blocking film or layer can be a hydrophilic colloid layer of gelatin (1.6 g/m$^2$) containing 320 mg/m$^2$ of a 1:1 weight ratio mixture of microcrystalline crossover reducing dyes such as arylidene dyes. Filter 150 can also serve as an X-ray energy filter.

Substrate 140 of front panel 110 and substrate 190 of back panel 160 can be made of glass, plastic, or metal foil. Preferably, substrate 140 or substrate 190, or both, can be made of borosilicate glass, aluminosilicate glass, fusion-formed glass, metal, or plastic, or combinations thereof. Substrate 140 can also act as an X-ray energy filter.

As an X-ray energy filter, substrate 140 or filter 150 can be a metal or alloy, where the metal or alloy is Al, Ti, V, Cr, Fe, Co, Ni, Cu, Zn, Zr, Nb, Mo, Ag, Cd, Sn, Ba, W, Ta, Au, or Pb, or combinations thereof.

Each panel has an array of signal sensing elements and readout devices (e.g., first array of signal sensing elements and readout devices 130 and second array of signal sensing elements and readout devices 180). In addition, as shown in FIG. 4, passivation layer 125 is disposed on first array of signal sensing elements and readout devices 130, and passivation layer 175 is disposed on second array of signal sensing elements and readout devices 180. Passivation layers (e.g., passivation layer 175) act as a protective coating for the array of signal sensing elements and readout devices (e.g., first signal sensing elements and readout devices 180) and are a common component of standard flat-panel technology using materials such as polyimide or silicon oxy-nitride.

First and second arrays of signal sensing elements and readout devices 130 and 180 can be amorphous silicon (a-Si:H) photodiodes with thin film transistor array structures. Possible a-Si:H photodiode thin film transistor array structures include (a) n-i-p, (b) Schottky barrier, and (c) metal-insulator-semiconductor (MIS). Although each photodiode structure has its advantages and disadvantages, the n-i-p (or p-i-n) structure is preferred due to its low level of dark current which results in higher signal-to-noise ratio and thus better image quality. The pixel pitch of the arrays of signal sensing elements and readout devices 130 and 180 used in the panels depends on the radiographic applications. In chest radiography, for example, the typical pixel pitch is between 100 μm and 250 μm, for mammography, the typical pixel pitch is between 50 μm and 150 μm and in megavoltage imaging the typical pixel pitch is between 200 μm to 2000 μm. The two panels (e.g., front panel 110 and back panel 160) are exposed to X-rays simultaneously. Subsequently, the two images (formed by front panel 110 and back panel 160) are combined and processed to yield a higher quality image.

First scintillating phosphor layer 120 is responsive to X-rays 102 passing through object 104 and produces light which illuminates the signal sensing elements of first array of signal sensing elements and readout devices 130 to provide signals representing a first X-ray image. Second scintillating phosphor layer 170 is responsive to X-rays passing through object 104 and front panel 110 to produce light which illuminates the signal elements of second array of signal sensing elements and readout devices 180 to provide signals representing a second X-ray image. These signals of the first and second X-ray images can be combined to produce a composite X-ray image.

Figure 5:
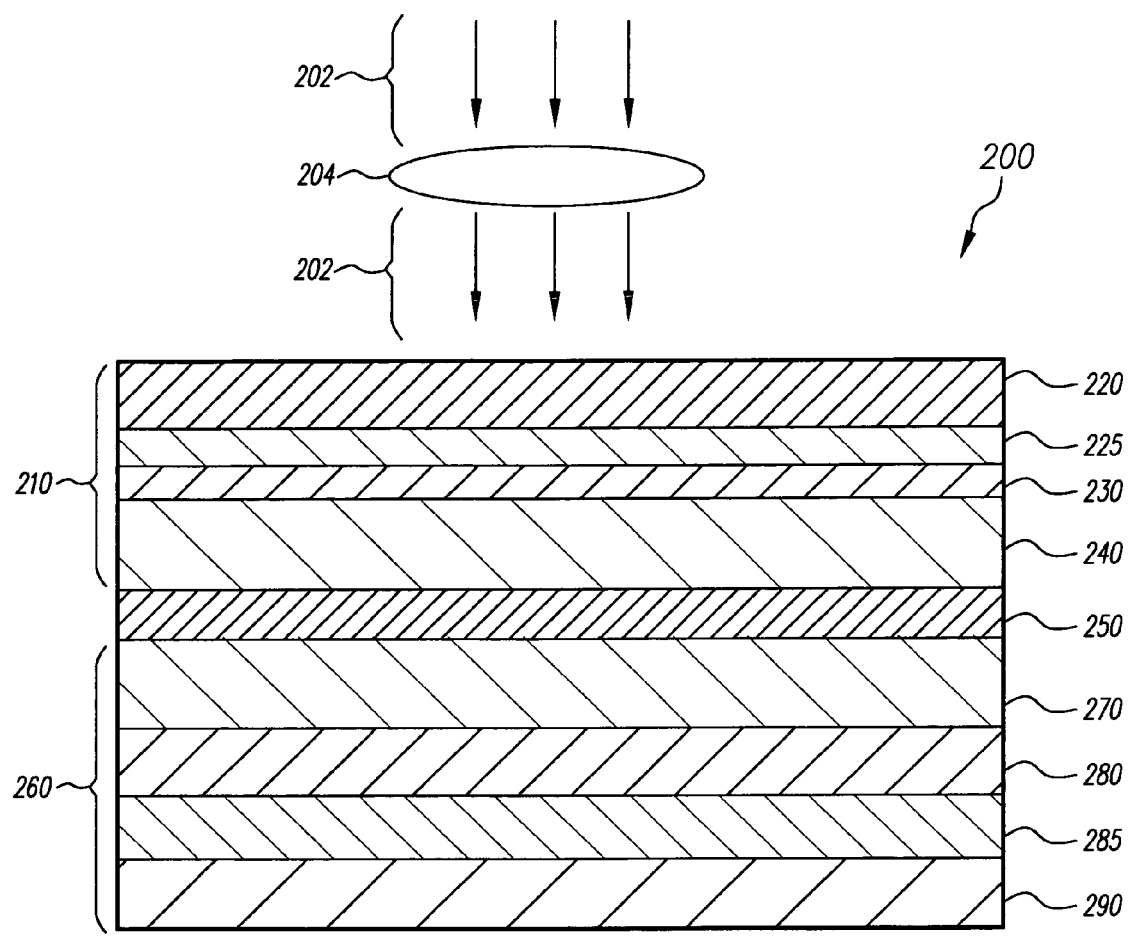
FIG. 5 shows a diagrammatic view of a dual-screen digital radiography flat-panel imager with a light-blocking film in accordance with an exemplary embodiment of the present invention.

FIG. 5 illustrates a second exemplary embodiment of the invention (front-back configuration), where X-rays 202 are directed through object 204 to digital radiography imager 200 to form an image. Digital radiography imager 200 has front panel 210 (in front screen configuration) and back panel 260 (in back screen configuration) separated by filter 250, which reduces the amount of crossover light between panels 210 and 260. In one aspect of this embodiment, filter 250 can be a light blocking film. Front panel 210 has first scintillating phosphor layer 220, passivation layer 225, first array of signal sensing elements and readout devices 230, substrate 240, any other suitable layer, or combinations thereof. Back panel 260 has substrate 270, second array of signal sensing elements and readout devices 280, passivation layer 285, second scintillating phosphor layer 290, any other suitable layer, or combinations thereof. Second scintillating phosphor layer 290 preferably has a thickness greater than or equal to first scintillating phosphor layer 220.

Substrates 240 and 270 can be made of glass, plastic, or metal foil. Preferably, substrate 240 or substrate 270, or both, can be made of borosilicate glass, aluminosilicate glass, fusion-formed glass, metal, or plastic, or combinations thereof. Substrate 240, filter 250, or both, can also act as an X-ray energy filter. As an X-ray energy filter, substrate 240 or filter 250 can be a metal or alloy, where the metal or alloy is Al, Ti, V, Cr, Fe, Co, Ni, Cu, Zn, Zr, Nb, Mo, Ag, Cd, Sn, Ba, W, Ta, Au, or Pb, or combinations thereof.

As with the configuration illustrated in FIG. 4, the two panels (front panel 210 and back panel 260) are stacked together back-to-back as shown in FIG. 5. The arrangement of the substrate, scintillating phosphor layer, passivation layer, and array of signal sensing elements and readout devices in back panel 260 is different from the arrangement of back panel 160 of FIG. 4. In FIG. 5, first scintillating phosphor layer 220 is responsive the X-rays passing through object 204 to produce light which illuminates the signal sensing elements of first array of signal sensing elements and readout devices 230 to provide signals representing a first X-ray image. Second scintillating phosphor layer 290 is responsive to X-rays passing though object 204 and front panel 210 to produce light which illuminates the signal sensing elements of second array of signal sensing elements and readout devices 280 that provide signals representing a second X-ray image. The signals of the first and second X-ray images are used to produce a composite X-ray image.

Figure 6:
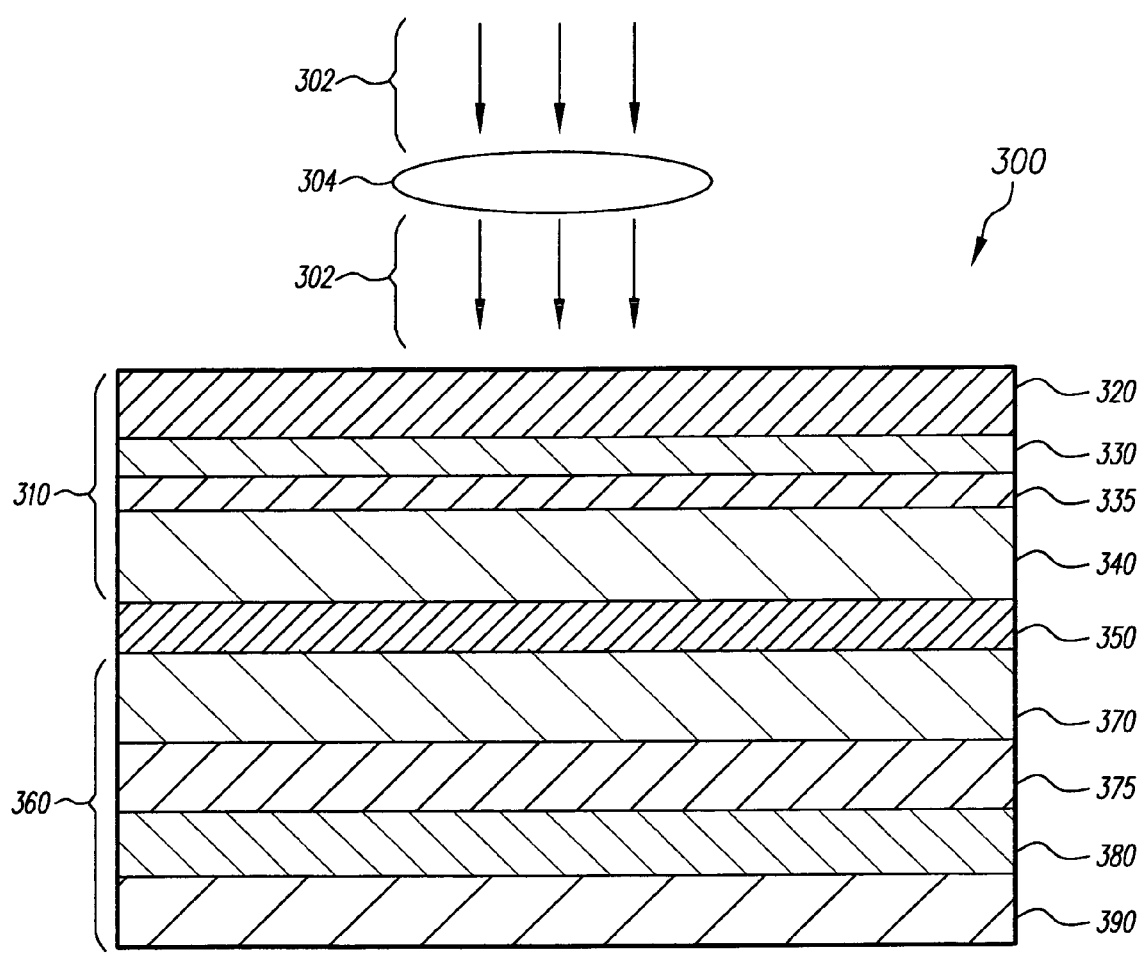
FIG. 6 shows a diagrammatic view of a dual-screen digital radiography flat-panel imager with a light-blocking film in accordance with an exemplary embodiment of the present invention.

A third exemplary embodiment is illustrated in FIG. 6 (back-front configuration). As shown, X-rays 302 are directed through object 304 towards digital radiography imager 300 to form an image. Digital radiography imager 300 has front panel 310 (in back screen configuration) and back panel 360 (in front screen configuration), with filter 350 between panels 310 and 360. Filter 350 can minimize the light from passing between front panel 310 and back panel 360. In one aspect of the invention, filter 350 can be a light blocking film. This light blocking film can be a hydrophilic colloid layer having gelatin and microcrystalline crossover reducing dyes sufficient to reduce crossover of light between the front panel and the back panel to less than 10 percent. Moreover, in another aspect of this embodiment, filter 350 can be an X-ray energy filter.

Figure 1B:
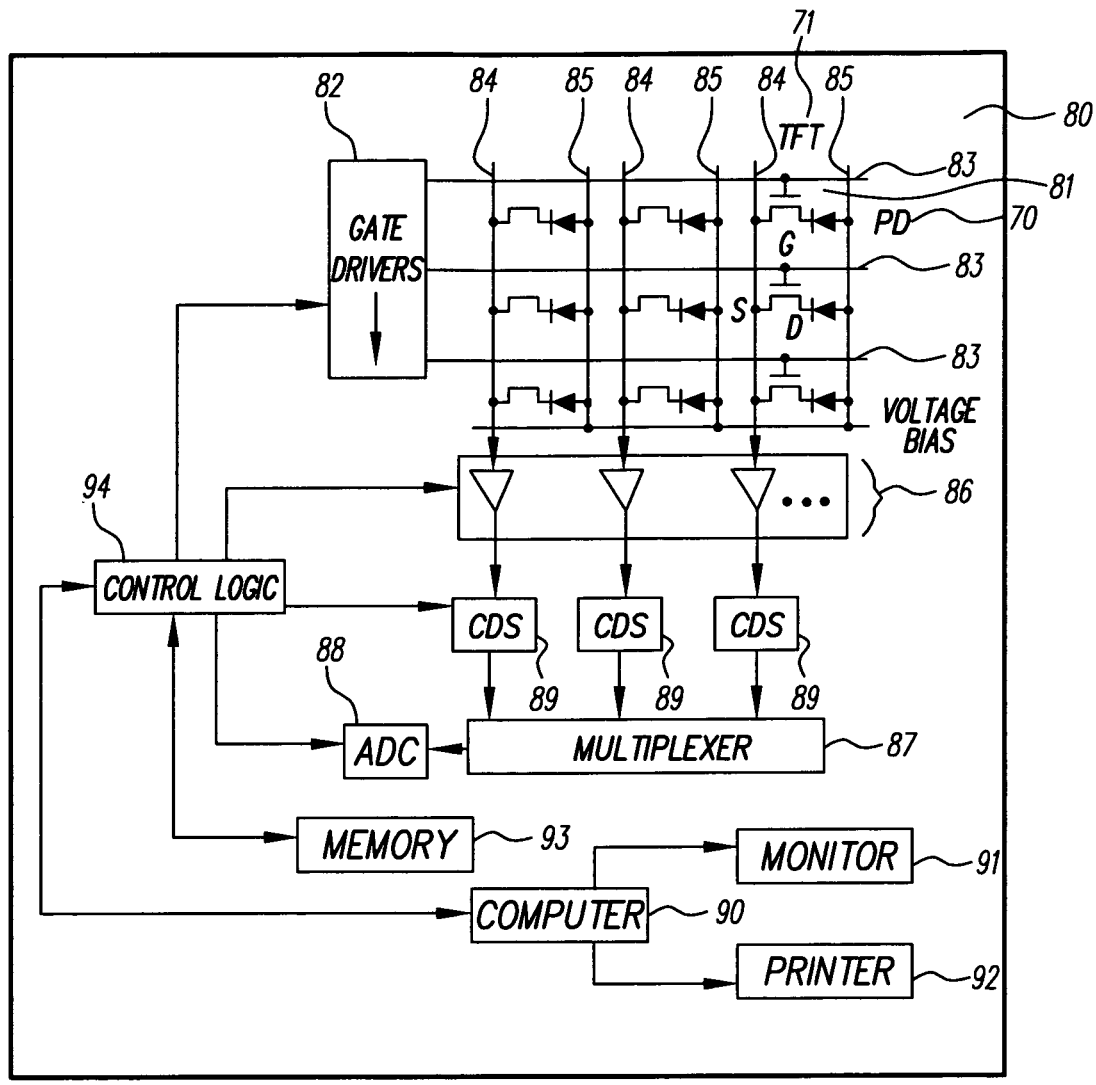
FIG. 1B shows a block diagram of a prior art single-screen a-Si based flat panel imager.
Figure 2:
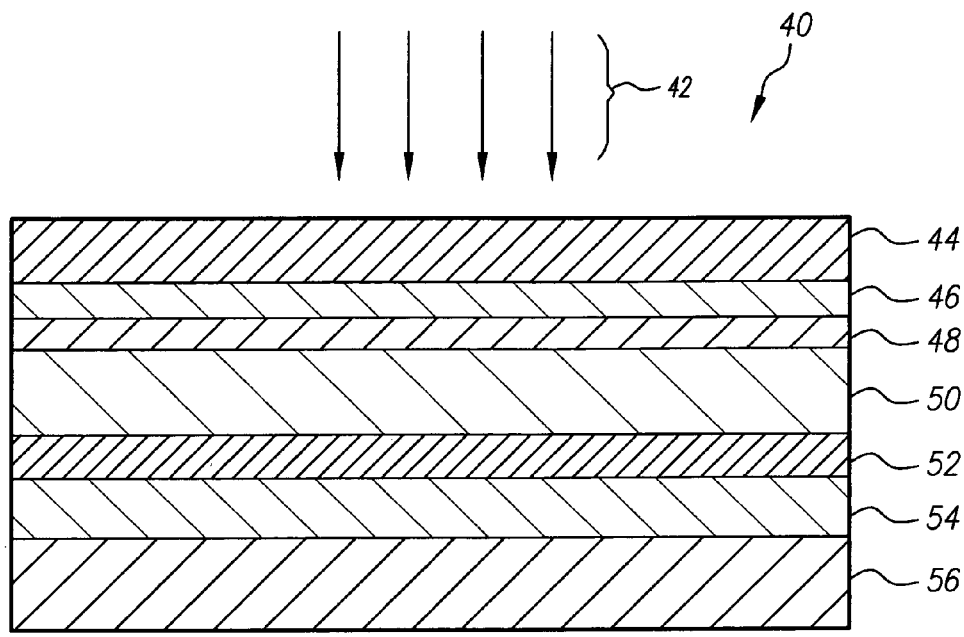
FIG. 2 shows a cross-section view of a prior art screen-film apparatus.
Figure 3:
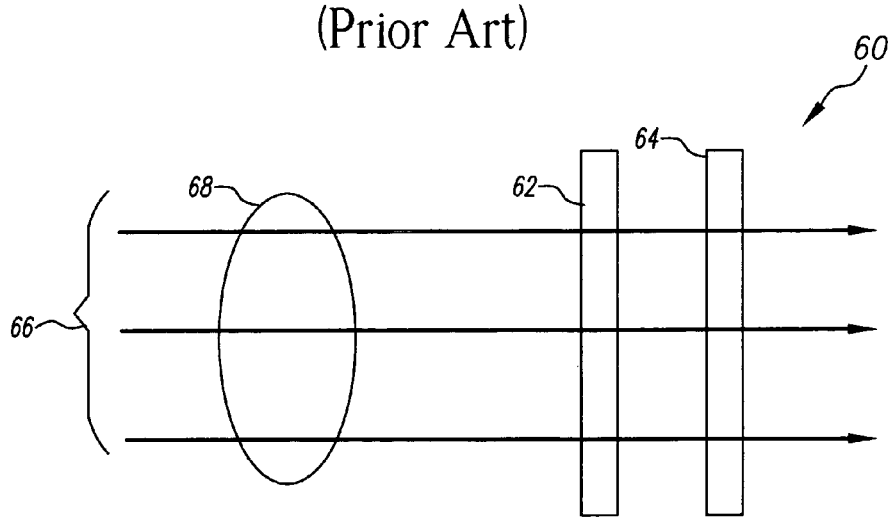
FIG. 3 shows a diagrammatic view of a prior art dual-screen CR imaging apparatus.

Imager 300 also has first array of signal sensing elements and readout devices 330 and second array of signal sensing elements and readout devices 380, passivation layer 335 and 375, first scintillating phosphor layer 340, second scintillating phosphor layer 370, and substrates 320 and 390. Second scintillating phosphor layer 370 can have a thickness which is greater than or equal to first scintillating phosphor layer 340. First and second arrays of signal sensing elements and readout devices 330 and 380 can have an arrangement of thin film transistor arrays and photodiodes, such as the arrangement depicted in FIG. 1B. Similar to the second embodiment depicted in FIG. 5, the panels 310 and 360 of digital radiography imager 300 are stacked together such that phosphor screens (i.e., first scintillating phosphor layer 340 and second scintillating phosphor layer 370) are facing each other and separated by filter 350.

Substrates 320 and 390 can be made of glass, plastic, or metal foil. Preferably, substrate 240 or substrate 270, or both, can be made of borosilicate glass, aluminosilicate glass, fusion-formed glass, metal, or plastic, or combinations thereof. Substrate 320, filter 350, or both, can also act as an X-ray energy filter. As an X-ray energy filter, substrate 320 or filter 350 can be a metal or alloy, where the metal or alloy is Al, Ti, V, Cr, Fe, Co, Ni, Cu, Zn, Zr, Nb, Mo, Ag, Cd, Sn, Ba, W, Ta, Au, or Pb, or combinations thereof.

First scintillating phosphor layer 340 is responsive to the X-rays passing through object 304 to produce light which illuminates the signal sensing elements of first array of signal sensing elements and readout devices 330 to provide signals representing a first X-ray image. Second scintillating phosphor layer 370 is responsive to X-rays passing though object 204 and front panel 310 to produce light which illuminates the signal sensing elements of second array of signal sensing elements and readout devices 380 that provide signals representing a second X-ray image. The signals of the first and second X-ray images are used to produce a composite X-ray image.

Figure 6A:
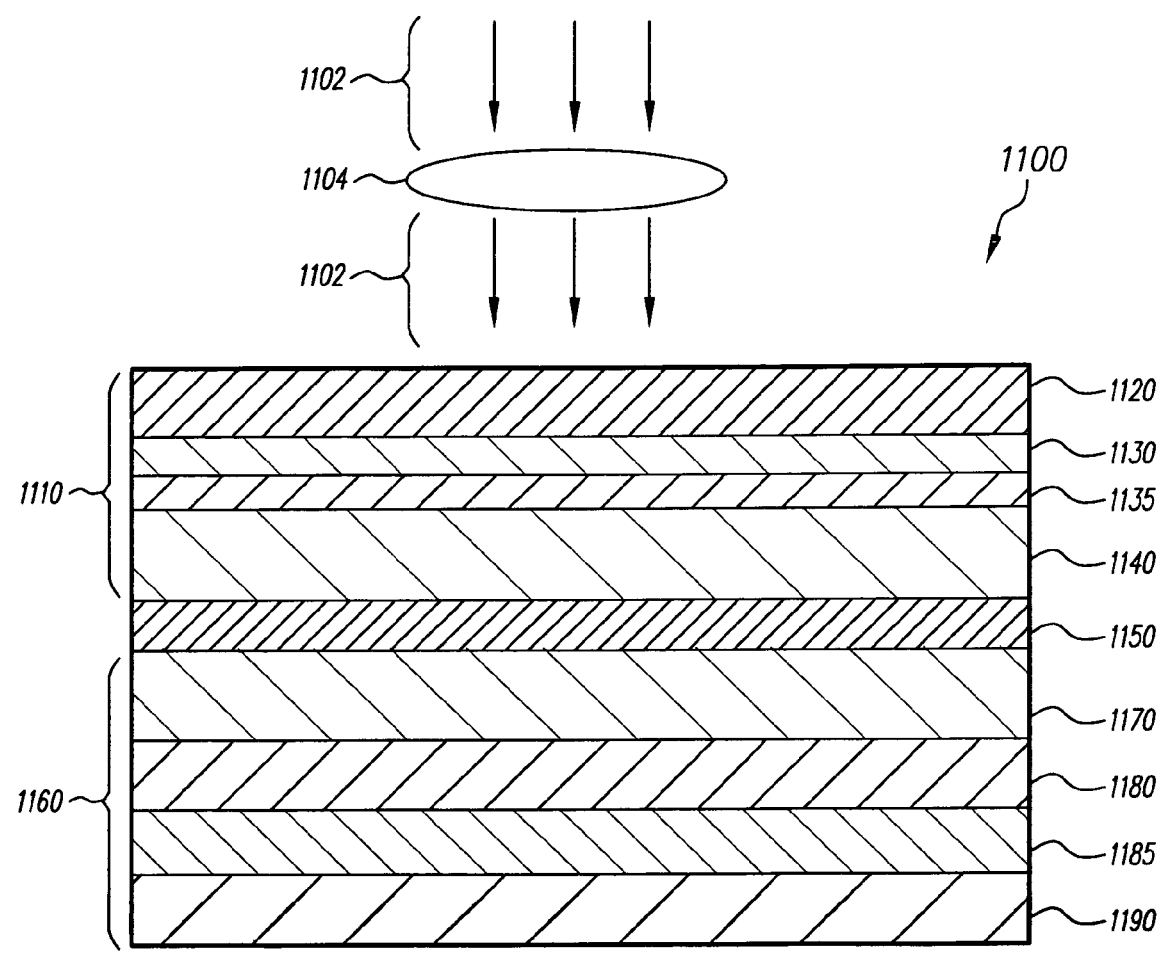
FIG. 6A shows a diagrammatic view of a dual-screen digital radiography flat-panel imager with a light-blocking film in accordance with an exemplary embodiment of the present invention.

FIG. 6A illustrates another exemplary embodiment of the invention (back-back configuration), where X-rays 1102 are directed through object 1104 to digital radiography imager 1100 to form an image. Digital radiography imager 1100 has front panel 1110 (in back screen configuration) and back panel 1160 (in back screen configuration) separated by filter 1150, which reduces the amount of crossover light between panels 1110 and 1160. In one aspect of this embodiment, filter 1150 can be a light blocking film. Front panel 1110 has substrate 1120, first array of signal sensing elements and readout devices 1130, passivation layer 1135, first scintillating phosphor layer 1140, any other suitable layer, or combinations thereof. Back panel 1160 of digital radiography imager 1100 has substrate 1170, second array of signal sensing elements and readout devices 1180, passivation layer 1185, second scintillating phosphor layer 1190, any other suitable layer, or combinations thereof. Second scintillating phosphor layer 1190 preferably has a thickness greater than or equal to first scintillating phosphor layer 1140.

Substrates 1120 and 1170 can be made of glass, plastic, or metal foil. Preferably, substrate 1120 or substrate 1170, or both, can be made of borosilicate glass, aluminosilicate glass, fusion-formed glass, metal, or plastic, or combinations thereof. Substrate 1120, filter 1150, or both, can also act as an X-ray energy filter. As an X-ray energy filter, substrate 1120 or filter 1150 can be a metal or alloy, where the metal or alloy is Al, Ti, V, Cr, Fe, Co, Ni, Cu, Zn, Zr, Nb, Mo, Ag, Cd, Sn, Ba, W, Ta, Au, or Pb, or combinations thereof.

In FIG. 6A, first scintillating phosphor layer 1140 is responsive the X-rays passing through object 1104 to produce light w ich illuminates the signal sensing elements of first array of signal sensing elements and readout devices 1130 to provide signals representing a first X-ray image. Second scintillating phosphor layer 1190 is responsive to X-rays passing though object 1104 and front panel 1110 to produce light which illuminates the signal sensing elements of second array of signal sensing elements and readout devices 1180 that provide signals representing a second X-ray image. The signals of the first and second X-ray images are used to produce a composite X-ray image.

Figure 7:
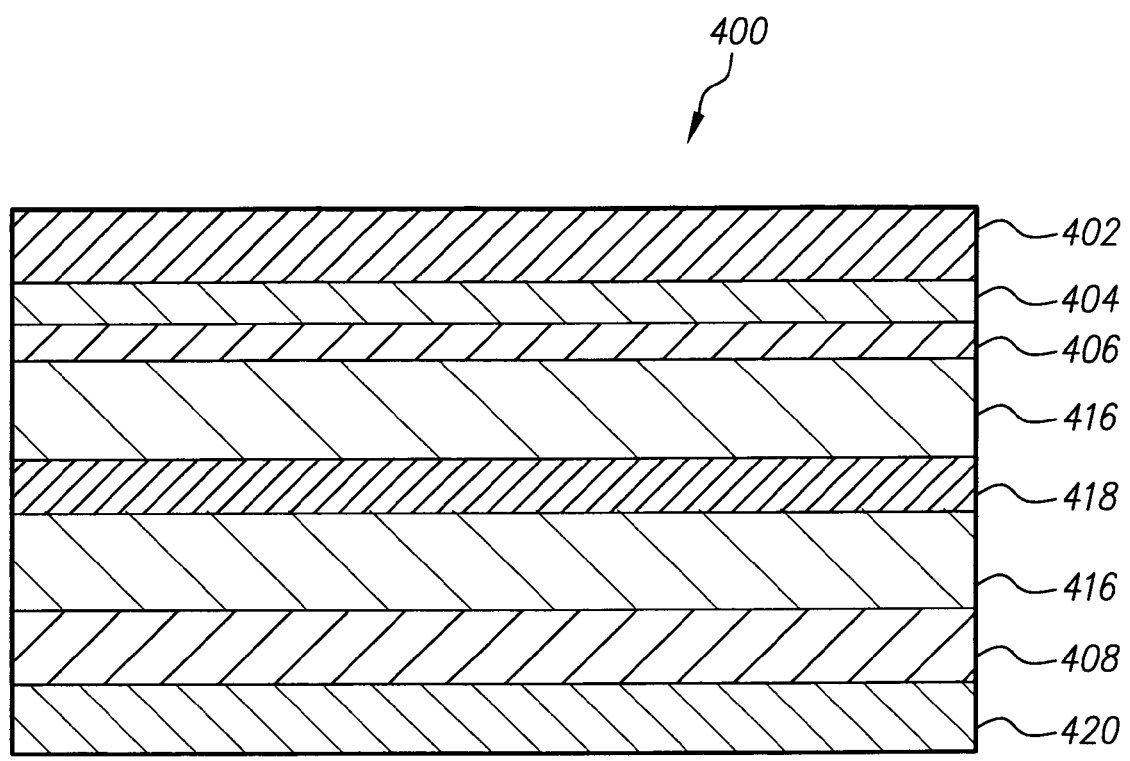
FIG. 7 shows a diagrammatic view of a dual-screen digital radiography flat-panel imager with a common glass substrate and a crossover reducing layer on each side of the substrate in accordance with an exemplary embodiment of the present invention.

FIG. 7 shows yet another embodiment of the invention. Digital radiography imager 400 includes, but is not limited to: first scintillating phosphor layer 402, passivation layer 404, first array of signal sensing elements and readout devices 406, second array of signal sensing elements and readout devices 408, crossover reducing layer 416, substrate 418, and second scintillating phosphor layer 420.

In addition, although FIG. 7 illustrates two crossover reducing layers (i.e., crossover reducing layer 416), digital radiographic imager could utilize a single crossover reducing layer in either of the locations depicted.

Instead of using two panels to capture the radiographic image, digital radiography imager 400 uses a single panel having a phosphor layer coated on the front side of the substrate (i.e., first scintillating phosphor layer 402) and a phosphor layer (i.e., second scintillating phosphor layer 420) coated on the back side of substrate 418 as shown in FIG. 7. In one aspect of this embodiment, second scintillating phosphor layer 420 can have a thickness which is greater than or equal to the thickness of first scintillating phosphor layer 402. Each side of the substrate has an array of signal sensing elements and readout devices (e.g., first array of signal sensing elements and readout devices 406 and second array of signal sensing elements and readout devices 408). A light blocking layer (i.e., crossover reducing layer 416) is preferably coated on each side of substrate 418 to minimize the crossover of light emitted in phosphor screen on one side of substrate 418 to the photodiode on the other side of substrate 418. As indicated above, crossover reducing layer 416 could be coated on a single side of substrate 418. Substrate 418 can be borosilicate glass, aluminosilicate glass, fusion-formed glass, or plastic capable of transmitting light, or combinations thereof.

Crossover reducing layer 416 which blocks light has a hydrophilic colloid layer with gelatin (1.6 g/m$^2$) containing 320 mg/m$^2$ of a 1:1 weight ratio mixture of microcrystalline crossover reducing dyes such as arylidene dyes. First and second scintillating phosphor layers 402 and 420 are exposed to X-rays simultaneously and the photodiode on the front and back sides of substrate 418 detect the front and back image respectively. Subsequently, the two images are combined and processed to yield a higher quality image. Since the two images detected by first scintillating phosphor layer 402 and second scintillating phosphor layer 420 are in mirror image relation to each other, one or the other of the two images should be inverted when the image processing is performed.

In the dual-screen digital radiography (DR) embodiments described above and illustrated in FIGS. 4-7, the front panel can have a scintillating phosphor layer providing high MTF (high resolution) and the back panel can have a scintillating phosphor layer with a thickness greater than or equal to phosphor layer in the front panel, which absorbs most (if not all) the transmitted X-rays through the front panel and the substrate. As a result, these dual-screen DR apparatus can have a higher resolution and improved X-ray absorption efficiency than the conventional single-screen DR apparatus. Front and back screen material combinations can include, but are not limited to, the combinations provided in Table 1 below. The phosphor material used in the front panel can be different from that used in the back panel as long as the scintillating phosphor layer in the front panel provides higher MTF than the phosphor layer in the back panel.

TABLE 1

Examples for front/back screen combinations used in asymmetric dual-screen digital radiography apparatus.

| Front screen | Back screen | Front screen coating weight (mg/cm2) | Back screen Coating weight (mg/cm2) |
| --- | --- | --- | --- |
| $Gd_2O_2S:Tb$ | $Gd_2O_2S:Tb$ | 34 | 70 |
| $Gd_2O_2S:Tb$ | $Gd_2O_2S:Tb$ | 34 | 133 |
| $Y_2O_2S:Tb$ | $Gd_2O_2S:Tb$ | 43 | 133 |
| CsI:Tl | CsI:Tl | 38 | 250 |
| $CaWO_4$ | $CaWO_4$ | 25 | 77 |
| BaFBr:Eu | BaFBr:Eu | 50 | 200 |
| CsI:Tl | $Gd_2O_2S:Tb$ | 38 | 70 |
| CsI:Tl | $Gd_2O_2S:Tb$ | 38 | 133 |
| $CaWO_4$ | LaOBr | 25 | 128 |

Substrates used for active matrix flat-panel imagers can be made of glass such as Corning 7059 borosilicate sheet glass, Corning 1737 aluminosilicate glass, Corning EAGLE$^{2000}$ fusion-formed glass, Schott D263T, or AF45 borosilicate glasses. The thicknesses of these Corning glass substrates are ranged from 0.4 mm to 1.1 mm, and the thickness of the Schott glasses can be as thin as 0.030 mm. In a conventional flat-panel digital radiography imager, the X-rays from the X-ray beam source (called primary X-rays) are not completely absorbed by the scintillating phosphor layer. Some X-rays are absorbed by the photodetector array (i.e., signal sensing elements) and some pass through the photodetector array (i.e., signal sensing elements) to encounter the glass substrate that may contain high concentrations of heavy elements such as barium. Some heavy-element atoms, upon absorbing the X-rays emit lower energy fluorescent X-rays (called secondary X-rays). These secondary X-rays are generated by the absorption of X-rays above the K or L absorption edges of the elements. An electron in the K or L shell is ejected by the absorption of the incident X-ray. When electrons cascade down to fill this vacant lower energy state, X-rays can be produced at energies characteristic for a particular element. The secondary X-rays can be emitted in any direction, but those emitted back to the phosphor screen can cause a loss of spatial resolution and an increase in image noise resulting in degradation in image quality. To reduce the absorption loss of X-ray radiation through the substrate and the generation of K-fluorescence in the substrate, the thickness of the substrate and the concentration of heavy elements in the substrate should be as small as possible without sacrificing the functionality, mechanical strength, and durability of the substrate. Generally, the absorption loss of X-ray radiation due to the substrate should be less than about 40%, and preferably can be less than 26% at a X-ray energy of about 60 keV.

Other types of organic and inorganic materials that can be used as substrates for active matrix flat-panel imagers are plastics (e.g., polyethylene terephthalate (PET), polyethylene naphthalate, cellulose acetate, or any other suitable plastic material or combinations thereof), metal foils (e.g., stainless steel, carbon steel, aluminum, anodized aluminum, copper, brass, any other suitable metal, or combinations thereof), or other suitable materials. Generally, PET has been used as the substrate for the phosphor screen and as the emulsion film base in conventional screen-film radiographic apparatus. This material possesses many excellent basic properties such as high mechanical strength, good chemical resistance, low water absorption, and high dimensional stability. Furthermore, it is lighter and sturdier than glass. Moreover, the surface of the PET film can be pretreated during manufacturing to give other desirable surface properties, such as adhesion to evaporated metals and a range of solvent and aqueous-based lacquers, ultraviolet-cured polymers, and photographic gelatins, for which surface energies in excess of 72 dynes/cm can be provided to form strong bonding. The insulating properties of PET film result in high surface resistivities in excess of $10^{14}$ ohm/m$^2$ at 23° C. and 70% relative humidity. More importantly, the PET film is highly permeable to X-rays and produces negligible K-fluorescence X-rays. As a result, the losses of X-ray absorption and spatial resolution caused by the PET substrate are significantly less than the glass substrate.

Table 2 below shows the dependence of X-ray absorption on substrate thickness for various substrate materials at 60 keV (gamma ray emission of Am$^{241}$).

TABLE 2

Dependence of X-ray absorption on substrate thickness for various substrate materials at 60 keV.

| Substrate | Thickness (mm) | X-ray absorption at 60 keV (%) |
|---|---|---|
| Corning 7059 glass | 1.1 | 47.5 |
| | 0.7 | 33.6 |
| | 0.4 | 20.9 |
| Corning 1737 glass | 1.1 | 25.9 |
| | 0.7 | 17.4 |
| | 0.4 | 10.3 |
| Copper foil | 0.508 | 52.0 |
| | 0.381 | 42.4 |
| | 0.254 | 30.7 |
| | 0.178 | 22.7 |
| | 0.102 | 13.7 |
| | 0.051 | 7.08 |
| | 0.025 | 3.61 |
| Stainless steel foil | 0.508 | 38.5 |
| | 0.381 | 30.5 |
| | 0.254 | 21.6 |
| | 0.178 | 15.6 |
| | 0.102 | 9.26 |
| | 0.051 | 4.74 |
| | 0.025 | 2.40 |
| Anodized aluminum foil | 0.508 | 3.89 |
| | 0.381 | 2.93 |
| | 0.254 | 1.96 |
| | 0.178 | 1.38 |
| | 0.102 | 0.79 |
| | 0.051 | 0.40 |
| | 0.025 | 0.20 |
| Polyethylene terephthalate (PET) | 1.1 | 2.86 |
| | 0.7 | 1.83 |
| | 0.4 | 1.05 |
| | 0.178 | 0.47 |
| | 0.102 | 0.27 |

As shown in Table 2, the use of anodized aluminum or PET as a substrate material reduces the penetration loss of incoming X-rays. Also, the use of a flexible substrate (e.g., metal foil (aluminum), plastic sheet (PET), or combinations of metal foil and plastic sheet, or any other suitable combinations) for the flat panel imaging apparatus would improve the mechanical strength and physical durability (robustness) of the apparatus.

The various embodiments of the asymmetric dual-screen digital radiography apparatus with two or more scintillating phosphor layers illustrated in FIGS. 4-7 have several advantages over prior art single-screen digital radiography apparatus (i.e., devices having a single scintillating phosphor layer). The above-described dual-screen apparatus have higher MTF, which yields a sharper image. Also, higher X-ray absorption yields higher detector speed and lower patient exposure and dose. The lower noise levels exhibited by the dual-screen embodiments have less apparent quantum mottle. Higher detective quantum efficiency can translate into high overall image quality. Furthermore, the use of a pair of asymmetric screens in an indirect DR apparatus can significantly ease the conflict in the design of an X-ray phosphor screen to simultaneously maintain both the X-ray absorption (which in general requires a thicker scintillating phosphor layer) and the spatial resolution (which in general requires a thinner scintillating phosphor layer). Furthermore, the use of a flexible substrate (such as metal foil (aluminum), plastic sheet (PET), or combinations of metal foil and plastic sheet) for the flat panel imaging apparatus improves the mechanical strength and physical durability (robustness) of the apparatus and reduces the X-ray absorption loss due to the substrate.

In general, the use of the X-ray absorption efficiency and the spatial-frequency-dependent modulation transfer function, MTF(f), is not a complete measure of an imaging apparatus. Detective quantum efficiency, DQE(f), is a better image quality metric because it also includes the noise transfer characteristics of the imaging apparatus. Detective quantum efficiency is defined by $$DQE(f) = \frac{S^2 MTF^2(f)}{\Phi \cdot NPS(f)}$$

where S is the image signal, $\Phi$ is X-ray fluence, and NPS is the noise power spectrum.

For a dual-screen apparatus, the image signal in the superimposed image (S) can be linearly combined from the front image signal ($S_1$) and the back image signal ($S_2$) as follows:

$S = \alpha S_1 + (1-\alpha) S_2$ where $\alpha$ and $(1-\alpha)$ are the weighting factors used to superimpose the front and back images. For maximum image quality (or DQE) the front and back images should be weighted in a frequency-dependent manner (i.e., $\alpha$ is a function of spatial frequency) and in such a way that their magnitudes are proportional to the DQE divided by the MTF of the corresponding screen. The optimized DQE of the superimposed image is equal to the sum of the DQEs for the front and back images.

$DQE_{opt}(f) = DQE_1(f) + DQE_2(f)$

As an example, the imaging performance in terms of MTF and DQE of an indirect asymmetric dual-screen DR apparatus, as shown in FIG. 4 for the first exemplary embodiment of the invention, is calculated as follows. In this apparatus, both the front panel and the back panel employ $Gd_2O_2S:Tb$ in the phosphor screen and a-Si:H photodiodes/TFT switches in the photodetector array. The photodiode array has a pixel pitch of 127 μm, a fill factor of 57%, and an additive electronic noise of 4000 e/pixel.

Figure 15:
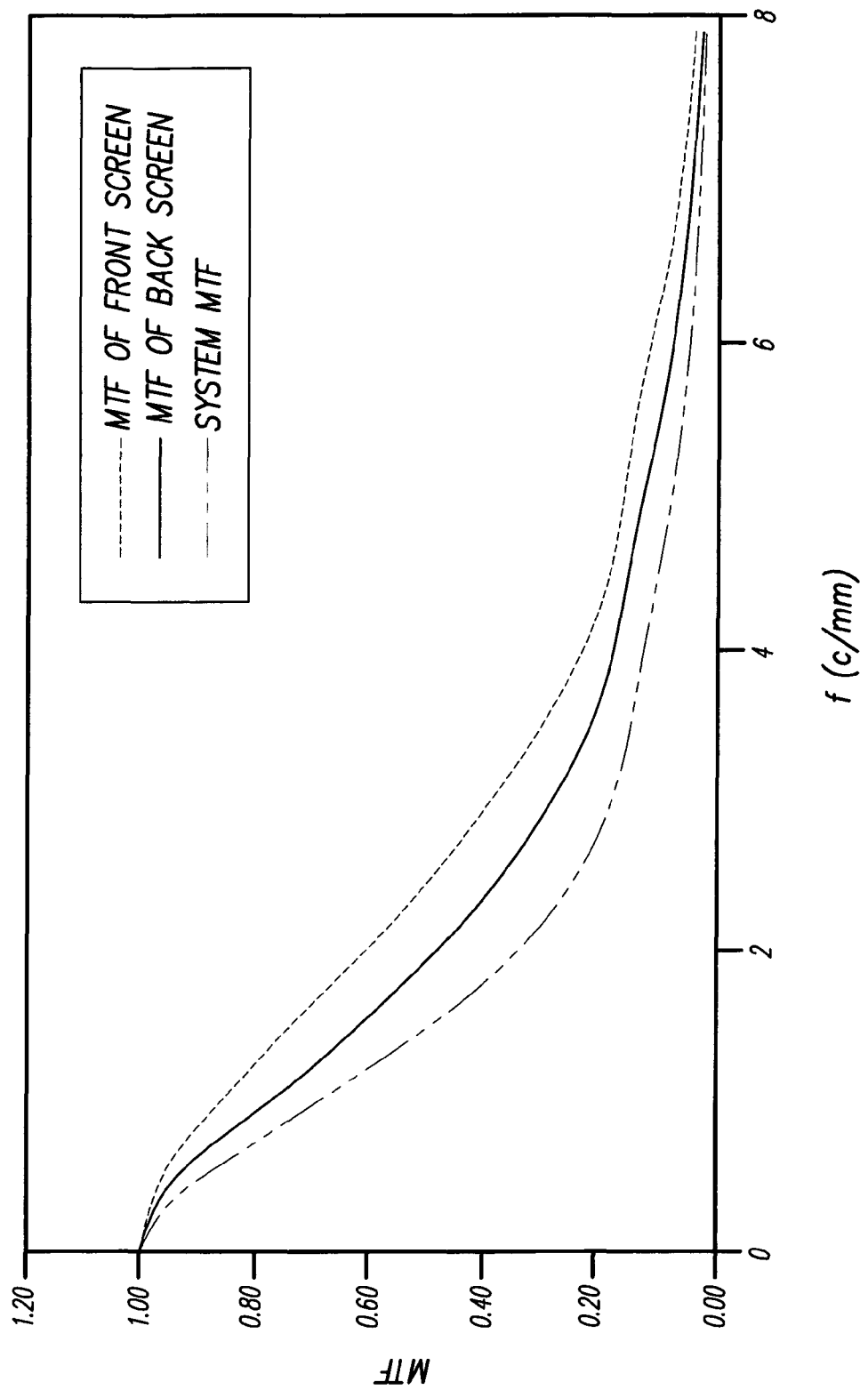
FIG. 15 shows the presampling modulation transfer function of an asymmetric dual-screen digital radiography flat-panel imager.
Figure 16:
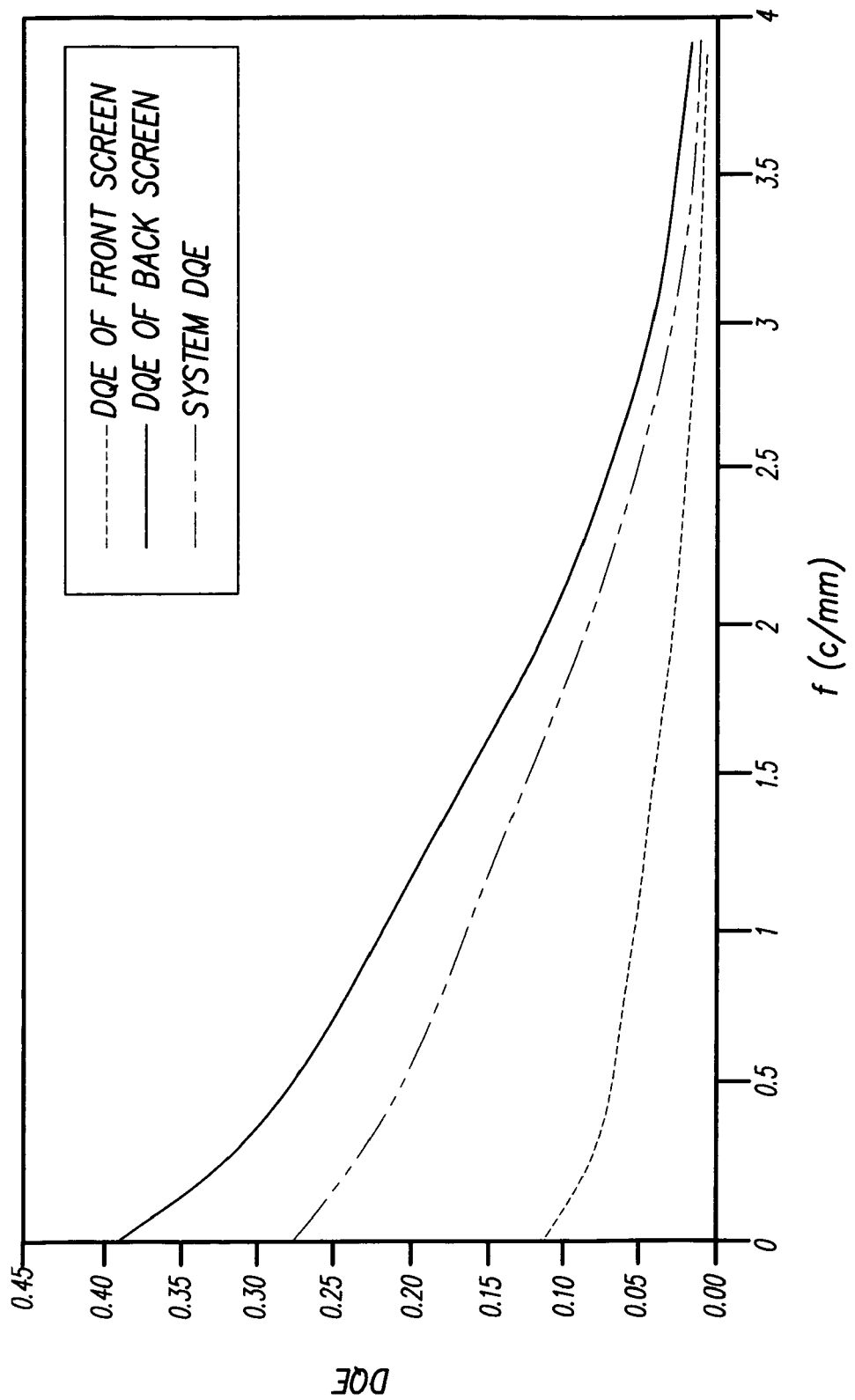
FIG. 16 shows the detective quantum efficiency of an asymmetric dual-screen digital radiography flat-panel imager.

FIG. 15 shows the MTF of the front panel having a scintillating phosphor layer ("MTF of Front Screen"), the MTF of the back panel having a scintillating phosphor screen with a thickness that is greater than or equal to that of the phosphor layer in the front panel ("MTF of Back Screen"), and the MTF of the dual-phosphor layer apparatus ("System MTF"). As expected, the MTF of the dual-layer apparatus is about the average of the two single-phosphor layer apparatus. FIG. 16 shows the DQE of the apparatus with two scintillating phosphor layers, which is about the sum of the DQE of the front panel with one scintillating phosphor layer ("DQE of Front Screen") and the DQE of the back panel with a scintillating phosphor layer ("DQE of Back Screen"). Due to the increase in X-ray absorption efficiency, the substantial increase in DQE for the dual-screen apparatus results in significant improvement in image quality over the single-screen apparatus.

Single-Exposure Dual Energy DR Apparatus

FIGS. 8-14 illustrate various embodiments of indirect dual-screen DR flat panel imagers for single-exposure dual energy imaging applications.

Figure 8:
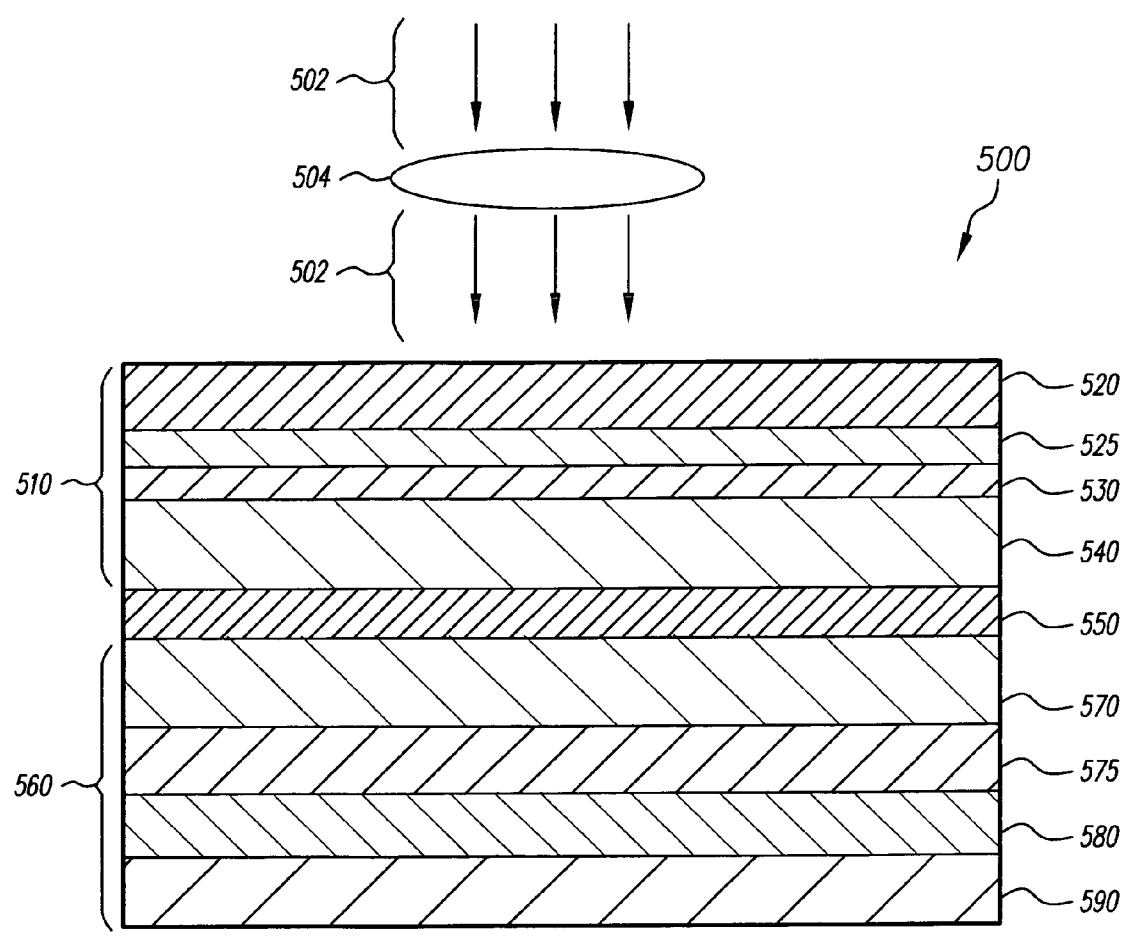
FIG. 8 shows a diagrammatic view of a dual-screen digital radiography flat-panel imager with an X-ray filter in accordance with an exemplary embodiment of the present invention for single-exposure dual energy imaging.

FIG. 8 illustrates digital radiography imager 500 that has two panels in front-front configuration that are used to create an image from X-rays 502 which are directed through object 504. In digital radiography imager 500, second scintillating phosphor layer 570 in back panel 560 is preferably of a thickness that is greater than or equal to first scintillating phosphor layer 520 in front panel 510. In addition to first scintillating phosphor layer 520, front panel 510 has passivation layer 525, first array of signal sensing elements and readout devices 530, and substrate 540. Filter 550, located between front panel 510 and back panel 560, absorbs the low-energy component of the X-rays penetrating first scintillating phosphor layer 520 and hardens the beam (i.e., removes the low-energy X-rays and causes the transmitted beam having high-energy X-rays) incident on second scintillating phosphor layer 570 and passivation layer 575. Filter 550 can be a material (e.g., metal or alloy) that absorbs the low-energy component of the X-ray radiation to a larger extent than the high-energy component of the radiation. The material can be Al, Ti, V, Cr, Fe, Co, Ni, Cu, Zn, Zr, Nb, Mo, Ag, Cd, Sn, Ba, W, Ta, Au, Pb, or combinations thereof. Filter 550 can behave as a light blocking layer to minimize the crossover of light emitted in one panel to the other panel (e.g., front panel 510 and back panel 560). In addition to second scintillating phosphor layer 570, passivation layer 575, back panel 560 has second array of signal sensing elements and readout devices 580 and substrate 590. First and second arrays of signal sensing elements and readout devices 530 and 580 can include thin film transistor arrays and photodiodes, similar to the arrangement shown in FIG. 1B.

In digital radiography imager 500, first scintillating phosphor layer 520 is responsive to X-rays 502 passing through object 504 and produces light which illuminates the signal sensing elements of first array of signal sensing elements and readout devices 530 to provide signals representing a first X-ray image. Second scintillating phosphor layer 570 is responsive to X-rays passing through object 504 and front panel 510 to produce light which illuminates the signal elements of second array of signal sensing elements and readout devices 580 to provide signals representing a second X-ray image. These signals of the first and second X-ray images can be combined to produce a composite X-ray image.

Figure 9:
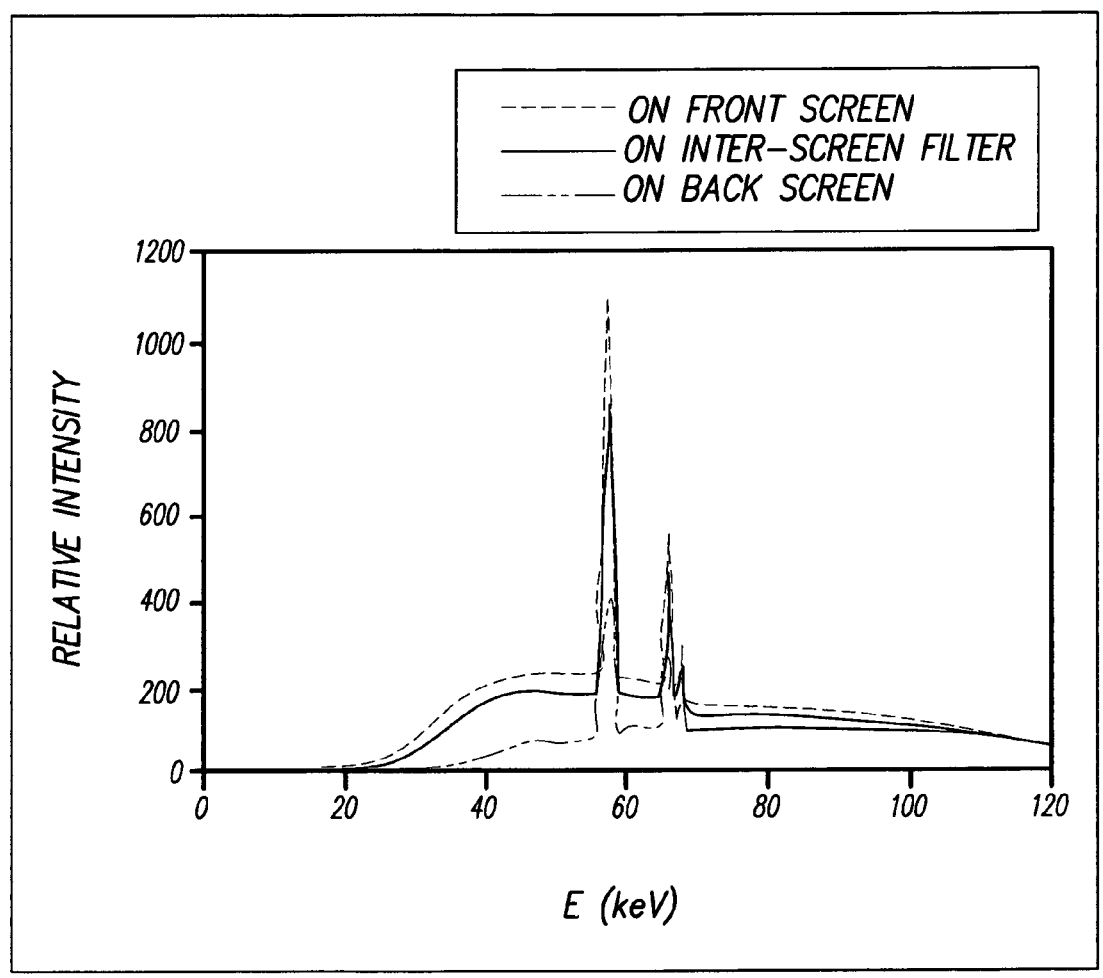
FIG. 9 is a chart illustrating incident X-ray spectra on various components of the imaging apparatus in accordance with an exemplary embodiment of the present invention shown in FIG. 8.

FIG. 9 illustrates the X-ray spectra (A, B, C) incident on the front screen (e.g., first scintillating phosphor layer 520 of FIG. 8), the inter-screen filter (e.g., filter 550 of FIG. 8), and the back screen (e.g., second scintillating phosphor layer 570), respectively. A 140-kVp technique can be used with tungsten target, 17° target angle, and 2.5 mm Al equivalent inherent filtration. The X-rays pass sequentially through a model patient (e.g., 7.7 cm Lucite simulating the soft tissue and 2.1 mm aluminum simulating the bone, or any other similar arrangement), a $Gd_2O_2S$ front screen of coating weight 34 mg/cm$^2$, a copper filter of thickness 0.5 mm, and a $Gd_2O_2S$ back screen of coating weight 133 mg/cm$^2$). The mean energy of Spectra A, B, and C are 68.4, 70.0, and 80.5 keV, respectively. The energy separation between the two X-ray spectra incident on the front and back screens (e.g., first scintillating phosphor layer 520 and second scintillating phosphor layer 570 of FIG. 8) can be a critical factor in the effectiveness of the tissue (or bone) cancellation and in the contrast-to-noise ratio in the subtracted image. The larger the energy separation, the better separation of the bone and soft tissue images is. The energy separation between the two X-ray spectra (A and C) incident on the front and back screens is about 12.1 keV, which is larger than the energy separation (about 11 keV) achieved in the single-exposure dual energy subtraction imaging using the CR technology.

In clinical operation, the X-ray beam sequentially passes through the patient, the front panel (e.g., front panel 510 of FIG. 8), the filter (e.g., filter 550 of FIG. 8), and the back panel (e.g., back panel 560 in FIG. 8) in a single exposure. The signals from the arrays of sensing elements and readout devices (e.g., first and second arrays 530 and 580 of FIG. 8) of the front and back panels, respectively, are digitized to yield the low- and high-energy radiation images. Pure bone and soft-tissue images can then be obtained by performing the image subtraction process.

The present invention can use emitting phosphors such as $Gd_2O_2S$:Tb, $Gd_2O_2S$:Eu, $Gd_2O_3$:Eu, $La_2O_2S$:Tb, $La_2O_2S$, $Y_2O_2S$:Tb, CsI:Tl, CsI:Na, CsBr:Tl, NaI:Tl, $CaWO_4$, $CaWO_4$:Tb, BaFBr:Eu, BaFCl:Eu, $BaSO_4$:Eu, $BaSrSO_4$, $BaPbSO_4$, $BaAl_{12}O_{19}$:Mn, $BaMgAl_{10}O_{17}$:Eu, $Zn_2SiO_4$:Mn, (Zn,Cd)S:Ag, LaOBr, LaOBr:Tm, $Lu_2O_2S$:Eu, $Lu_2O_2S$:Tb, $LuTaO_4$, $HfO_2$:Ti, $HfGeO_4$:Ti, $YTaO_4$, $YTaO_4$:Gd, $YTaO_4$:Nb, $Y_2O_3$:Eu, $YBO_3$:Eu, $YBO_3$:Tb, or $(Y,Gd)BO_3$:Eu, or combinations thereof. As detailed below, Table 3 provides preferred exemplary materials to be used in the front and back screens (e.g.: first scintillating phosphor layer 520 and second scintillating phosphor layer 570; the first or second scintillating phosphor layers shown in FIGS. 8 and 10-14; etc.) in single-exposure dual-energy digital radiography apparatus of the present invention. However, any suitable any suitable phosphor material (or combinations of materials), including doped phosphor materials, can be used in any of the embodiments of the present invention described herein. A blend of different phosphors can also be used.

TABLE 3

Examples for front/back screen combinations used in single-exposure dual-energy digital radiography apparatus.

| Front screen | Back screen | Front screen coating weight (mg/cm2) | Back screen coating weight (mg/cm2) |
| --- | --- | --- | --- |
| $Gd_2O_2S$:Tb | $Gd_2O_2S$:Tb | 34 | 133 |
| $Y_2O_2S$:Tb | $Gd_2O_2S$:Tb | 43 | 133 |
| CsI:Tl | $Gd_2O_2S$:Tb | 38 | 133 |
| $CaWO_4$ | $CaWO_4$ | 25 | 77 |
| LaOBr:Tm | $CaWO_4$ | 30 | 77 |
| CsI:Tl | CsI:Tl | 38 | 250 |
| BaFBr:Eu | BaFBr:Eu | 50 | 200 |

Figure 10:
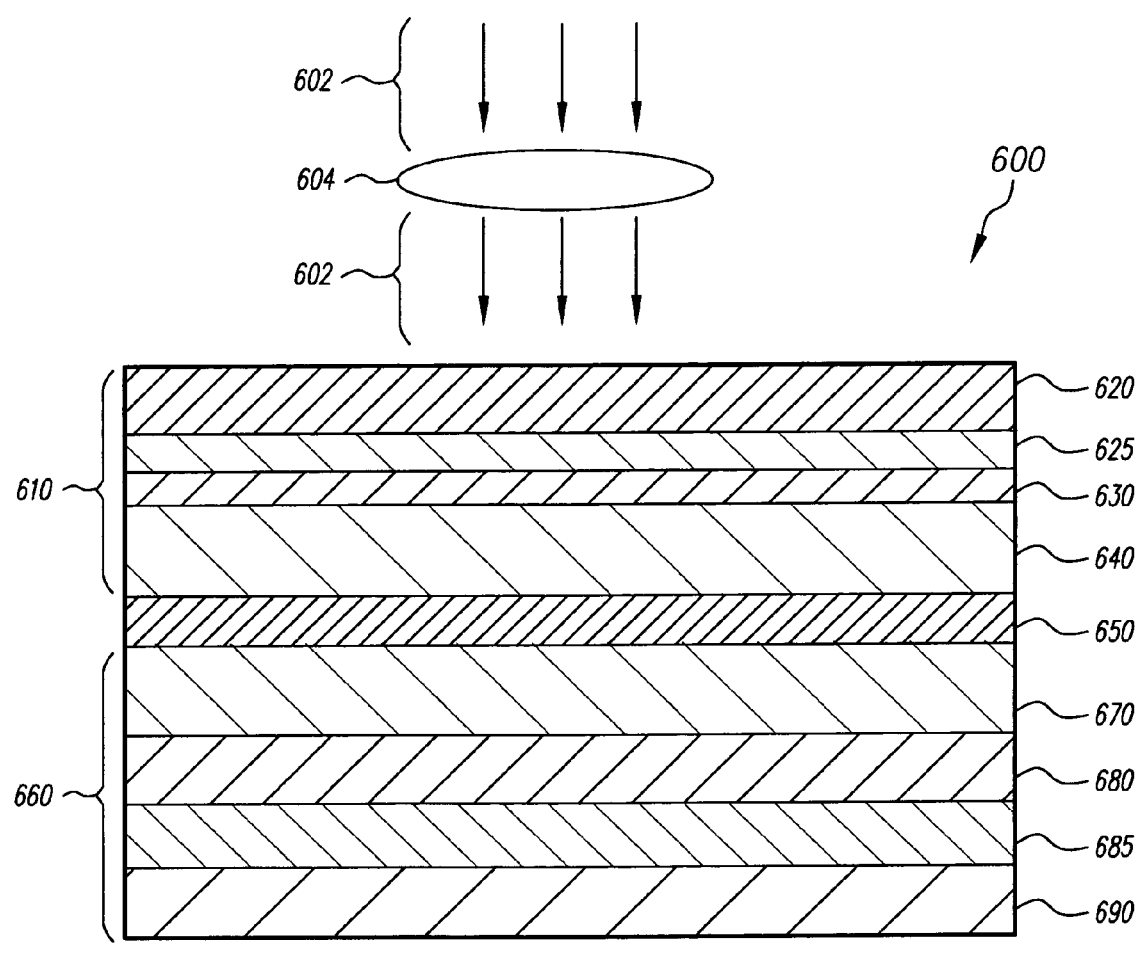
FIG. 10 shows a diagrammatic view of a dual-screen digital radiography flat-panel imager with an X-ray filter in accordance with an exemplary embodiment of the present invention for single-exposure dual energy imaging.

FIG. 10 illustrates another exemplary embodiment of a single-exposure dual energy DR apparatus in front-back configuration. X-rays 602 are directed through object 604 to the digital radiography imager 600 which is used to form an image. Similar to digital radiography imager 500 of FIG. 8, digital radiography imager 600 of FIG. 10 has two panels (e.g., front panel 610 and back panel 660) stacked together back-to-back and separated by filter 650. Filter 650 can be a material (e.g., metal or alloy) that absorbs the low-energy component of the X-ray radiation to a larger extent than the high-energy component of the radiation. The material can be Al, Ti, V, Cr, Fe, Co, Ni, Cu, Zn, Zr, Nb, Mo, Ag, Cd, Sn, Ba, W, Ta, Au, Pb, or combinations thereof. Filter 650 can also behave as a light blocking layer to minimize the crossover of light emitted in one panel to the other panel (e.g., front panel 610 and back panel 660).

In digital radiography imager 600, front panel 610 has first scintillating phosphor layer 620, passivation layer 625, first array of signal sensing elements and readout devices 630, substrate 640, any other suitable layer, or any combinations thereof. Back panel 660 has substrate 670, second array of signal sensing elements and readout devices 680, passivation layer 685, second scintillating phosphor layer 690, any other suitable layer, or any combinations thereof. Second scintillating phosphor layer 690 preferably has a thickness which is greater than or equal to that of first scintillating phosphor layer 620.

In the embodiment illustrated in FIG. 10, the arrangement of the substrate, signal sensing elements and readout devices, and second scintillating phosphor layer elements differs from that of digital radiography imager 500 of FIG. 8. However, the operation of digital radiography imager 600 is similar to digital radiography imager 500. In digital radiography imager 600, first scintillating phosphor layer 620 is responsive to X-rays 602 passing through object 604 and produces light which illuminates the signal sensing elements of first array of signal sensing elements and readout devices 630 to provide signals representing a first X-ray image. Second scintillating phosphor layer 690 is responsive to X-rays passing through object 604 and front panel 610 to produce light which illuminates the signal elements of second array of signal sensing elements and readout devices 680 to provide signals representing a second X-ray image. These signals of the first and second X-ray images can be combined to produce a composite X-ray image.

Figure 11:
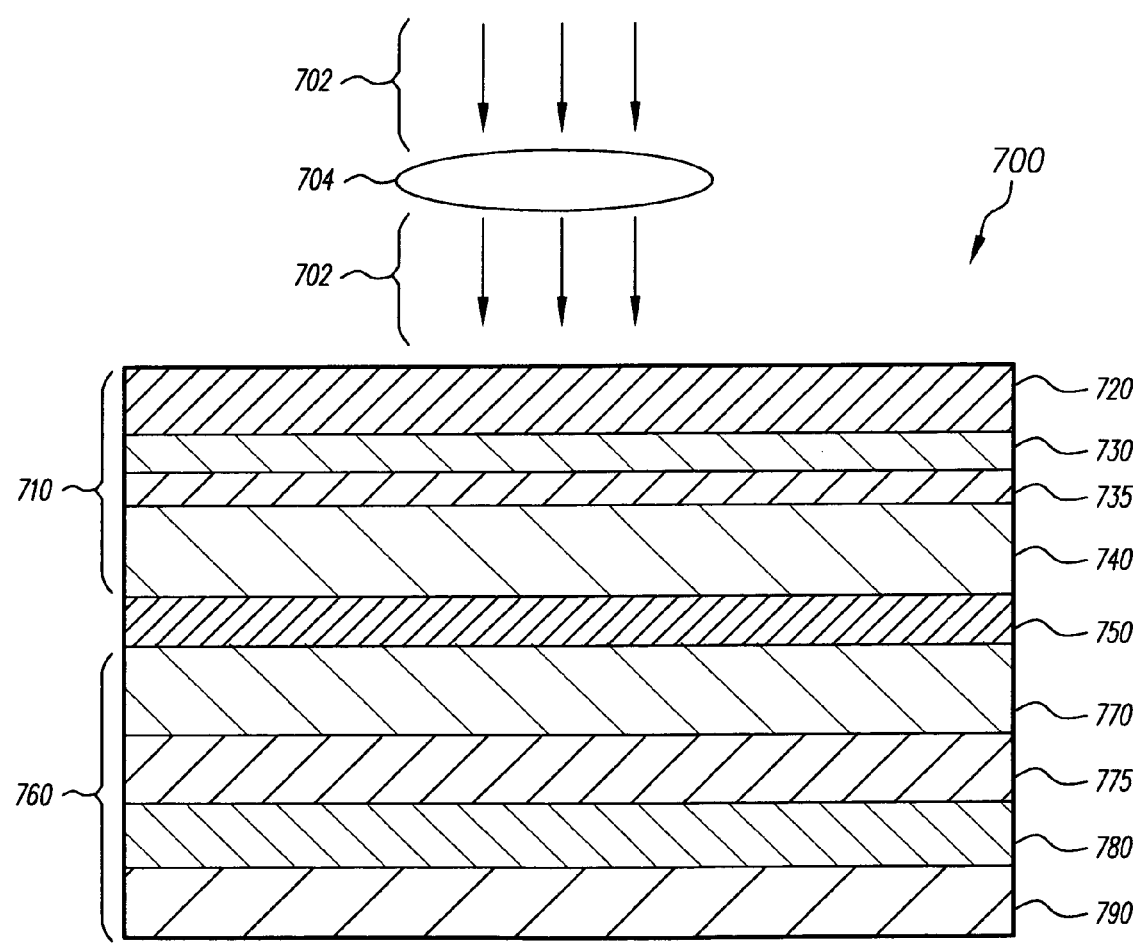
FIG. 11 shows a diagrammatic view of a dual-screen digital radiography flat-panel imager with an X-ray filter in accordance with an exemplary embodiment of the present invention for single-exposure dual energy imaging.

In another exemplary embodiment (back-front configuration) of the present invention illustrated in FIG. 11, X-rays 702 are directed through object 704 towards digital radiography imager 700 to form an image. Front panel 710 and back panel 760 of digital radiography imager 700 are stacked together such that the phosphor screens (e.g., first scintillating phosphor layer 740 and second scintillating phosphor layer 770) are facing each other. Front panel 710 has substrate 720, first array of signal sensing elements and readout devices 730, passivation layer 735, first scintillating phosphor layer 740, any other suitable layer, or any combinations thereof, and back panel 760 has second scintillating phosphor layer 770, passivation layer 775, second array of signal sensing elements and readout devices 780, substrate 790, any other suitable layer, or combinations thereof. Preferably, second scintillating phosphor layer 770 can have a thickness which is greater than or equal to that of first scintillating phosphor layer 740. Front panel 710 and back panel 760 are separated by filter 750, which can be made of a material such as Al, Ti, V, Cr, Fe, Co, Ni, Cu, Zn, Zr, Nb, Mo, Ag, Cd, Sn, Ba, W, Ta, Au, Pb, or combinations thereof. Filter 750 can also behave as a light blocking layer to minimize the crossover of light emitted in one panel to the other panel (e.g., front panel 710 and back panel 760).

The operation of digital radiography imager 700 is similar to digital radiography imagers 500 and 600. In digital radiography imager 700, first scintillating phosphor layer 740 is responsive to X-rays 702 passing through object 704 and produces light which illuminates the signal sensing elements of first array of signal sensing elements and readout devices 730 to provide signals representing a first X-ray image. Second scintillating phosphor layer 770 is responsive to X-rays passing through object 704 and front panel 710 to produce light which illuminates the signal elements of second array of signal sensing elements and readout devices 780 to provide signals representing a second X-ray image. These signals of the first and second X-ray images can be combined to produce a composite X-ray image.

Figure 11A:
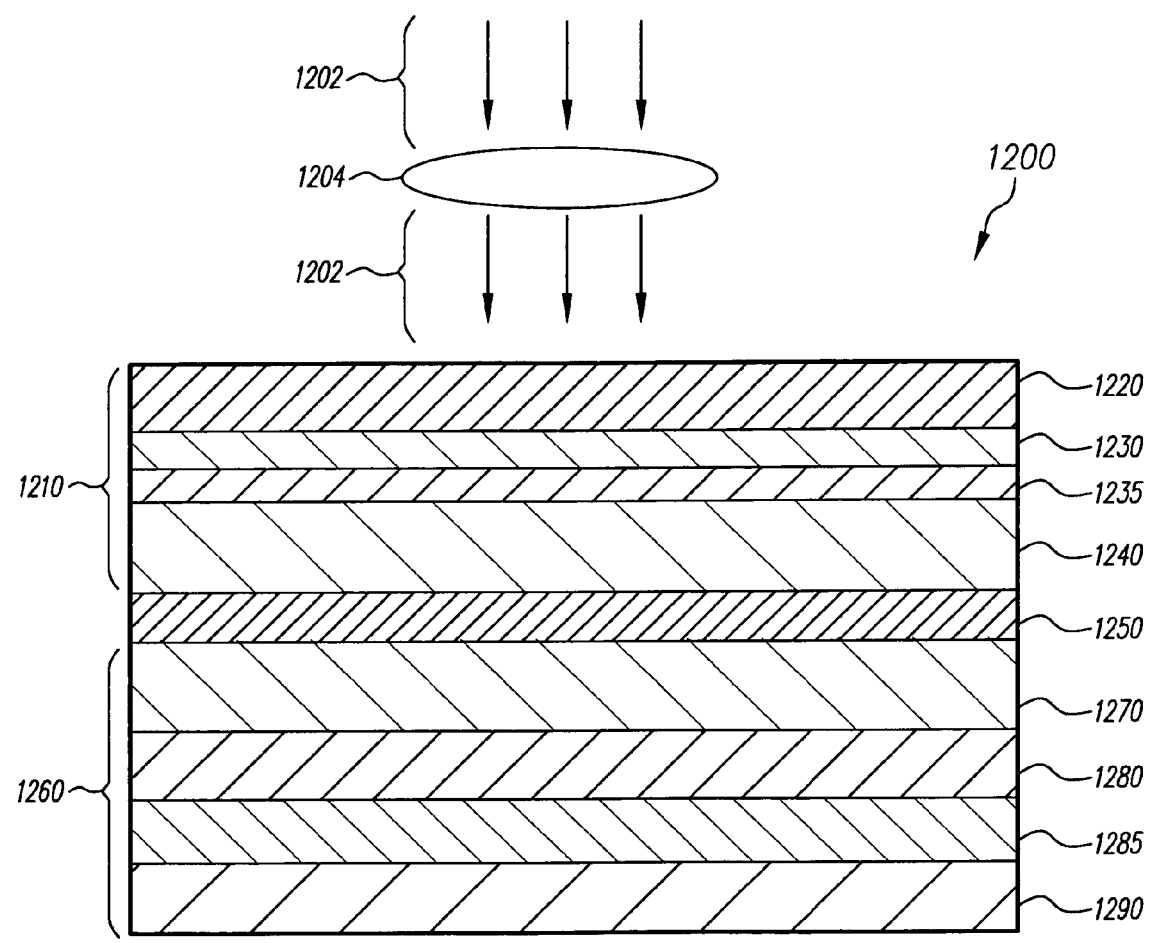
FIG. 11A shows a diagrammatic view of a dual-screen digital radiography flat-panel imager with an X-ray filter in accordance with an exemplary embodiment of the present invention for single-exposure dual energy imaging.

FIG. 11A illustrates another exemplary embodiment of the invention (back-back configuration), where X-rays 1202 are directed through object 1204 to digital radiography imager 1200 to form an image. Digital radiography imager 1200 has front panel 1210 (in back screen configuration) and back panel 1260 (in back screen configuration) separated by filter 1250. Filter 1250 can be made of a material such as Al, Ti, V, Cr, Fe, Co, Ni, Cu, Zn, Zr, Nb, Mo, Ag, Cd, Sn, Ba, W, Ta, Au, Pb, or combinations thereof. Filter 1250 can also behave as a light blocking layer to minimize the crossover of light emitted in one panel to the other panel (e.g., front panel 1210 and back panel 1260).

Front panel 1210 has substrate 1220, first array of signal sensing elements and readout devices 1230, passivation layer 1235, first scintillating phosphor layer 1240, any other suitable layer, or combinations thereof. Back panel 1260 of digital radiography imager 1200 has substrate 1270, second array of signal sensing elements and readout devices 1280, passivation layer 1285, second scintillating phosphor layer 1290, any other suitable layer, or combinations thereof. Second scintillating phosphor layer 1290 preferably has a thickness greater than or equal to first scintillating phosphor layer 1240.

Substrates 1220 and 1270 can be made of glass, plastic, or metal foil. Preferably, substrate 1120 or substrate 1170, or both, can be made of borosilicate glass, aluminosilicate glass, fusion-formed glass, metal, or plastic, or combinations thereof. Substrate 1220, filter 1250, or both, can also act as an X-ray energy filter. As an X-ray energy filter, substrate 1220 or filter 1250 can be a metal or alloy, where the metal or alloy is Al, Ti, V, Cr, Fe, Co, Ni, Cu, Zn, Zr, Nb, Mo, Ag, Cd, Sn, Ba, W, Ta, Au, or Pb, or combinations thereof.

In FIG. 11A, first scintillating phosphor layer 1240 is responsive the X-rays passing through object 1204 to produce light which illuminates the signal sensing elements of first array of signal sensing elements and readout devices 1230 to provide signals representing a first X-ray image. Second scintillating phosphor layer 1290 is responsive to X-rays passing though object 1204 and front panel 1210 to produce light which illuminates the signal sensing elements of second array of signal sensing elements and readout devices 1280 that provide signals representing a second X-ray image. The signals of the first and second X-ray images are used produce a composite X-ray image.

Figure 12:
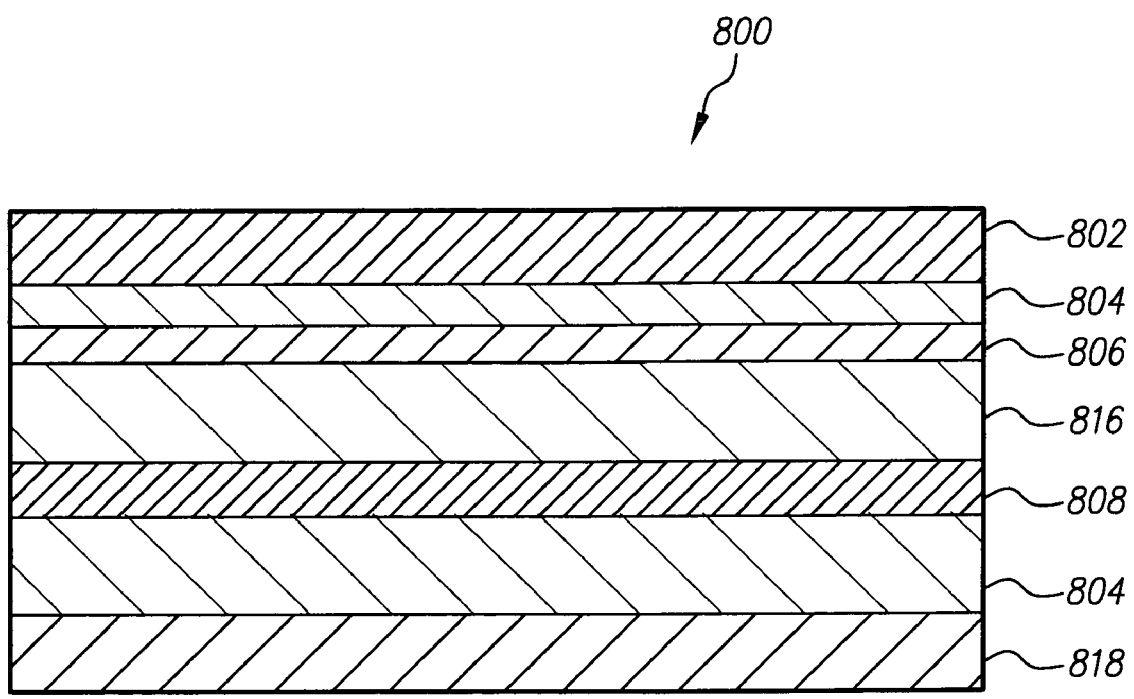
FIG. 12 shows a diagrammatic view of a dual-screen digital radiography flat-panel imager with a metallic substrate in accordance with an exemplary embodiment of the present invention for single-exposure dual energy imaging.

FIG. 12 shows another exemplary embodiment of a dual energy DR apparatus. Instead of using two panels to capture the radiographic image, digital radiography imager 800 uses a single panel having a phosphor layer (i.e., first scintillating phosphor screen 802) on a first side of the substrate, and another phosphor layer on a second side of the substrate (i.e., second scintillating phosphor layer 818).

Digital radiography imager 800 has scintillating phosphor layer 802, passivation layer 804, first array of signal sensing elements and readout devices 806, substrate 816, second array of signal sensing elements and readout devices 808, and second scintillating phosphor layer 818.

In one aspect of this embodiment, second scintillating phosphor layer 818 can have a thickness that is greater than or equal to first scintillating phosphor layer 802. In digital radiography imager 800 of FIG. 12, although similar to digital radiography imager 400 illustrated in FIG. 7, has some structural differences. The glass substrate (e.g., substrate 418 used in digital radiography imager 400 of FIG. 7) has been replaced by a metallic substrate material (e.g., copper foil, etc.) to absorb the low-energy component of the X-ray radiation.

In this embodiment, the metallic substrate material of substrate 816 can play the role of a substrate as well as a filter. Substrate 816 can be made of a material such as Al, Ti, V, Cr, Fe, Co, Ni, Cu, Zn, Zr, Nb, Mo, Ag, Cd, Sn, Ba, W, Ta, Au, Pb, or combinations thereof. First and second scintillating phosphor layers 802 and 818 are provided on opposite sides of the substrate. Since the radiation images (i.e., the radiation images to be subtraction processed) detected by scintillating phosphor layers 802 and 818 are mirror images in relation to each other, one or the other of the radiation images should be inverted when the subtraction processing is carried out.

Figure 13:
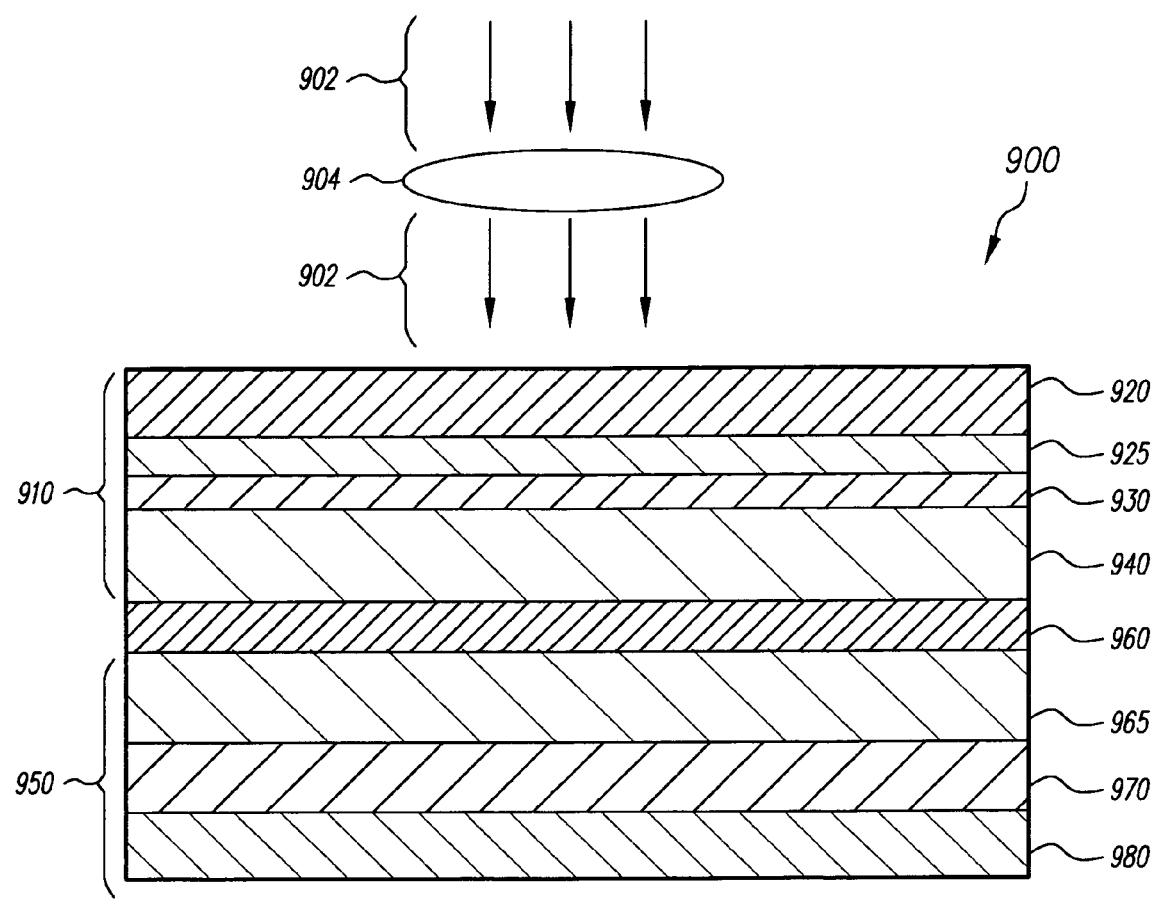
FIG. 13 shows a diagrammatic view of a dual-screen digital radiography flat-panel imager in accordance with an exemplary embodiment of the present invention for single-exposure dual energy imaging.

Turning to FIG. 13, X-rays 902 are directed though object 904 towards digital radiography imager 900 (in front-front configuration) that forms an image. Digital radiography imager 900 has front panel 910 (in frontscreen configuration) that is located adjacent to back panel 950 (in front screen configuration). Front panel 910 has first scintillating phosphor layer 920, passivation layer 925, first array of signal sensing elements and readout devices 930, substrate 940, any other suitable layer, or combinations thereof. Back panel 950 has second scintillating phosphor layer 960, passivation layer 965, second array of signal sensing elements and readout devices 970, substrate 980, any other suitable layer, or combinations thereof. Second scintillating phosphor layer 960 can have increased thickness over first scintillating phosphor layer 920. Front panel 910 has substrate 940 to absorb the low energy component of the X-ray radiation. Substrate 940 can also play the role of a filter. Substrate 940 can be made of a material such as Al, Ti, V, Cr, Fe, Co, Ni, Cu, Zn, Zr, Nb, Mo, Ag, Cd, Sn, Ba, W, Ta, Au, Pb, or combinations thereof.

In digital radiography imager 900, first scintillating phosphor layer 920 is responsive to X-rays 902 passing through object 904 and produces light which illuminates the signal sensing elements of first array of signal sensing elements and readout devices 930 to provide signals representing a first X-ray image. Second scintillating phosphor layer 970 is responsive to X-rays passing through object 904 and front panel 910 to produce light which illuminates the signal elements of second array of signal sensing elements and readout devices 970 to provide signals representing a second X-ray image. These signals of the first and second X-ray images can be combined to produce a composite X-ray image. First and second arrays of signal sensing elements and readout devices 930 and 970 can each be in an arrangement similar to that shown in with photodiodes and thin film transistors illustrated in FIG. 1B.

Figure 14:
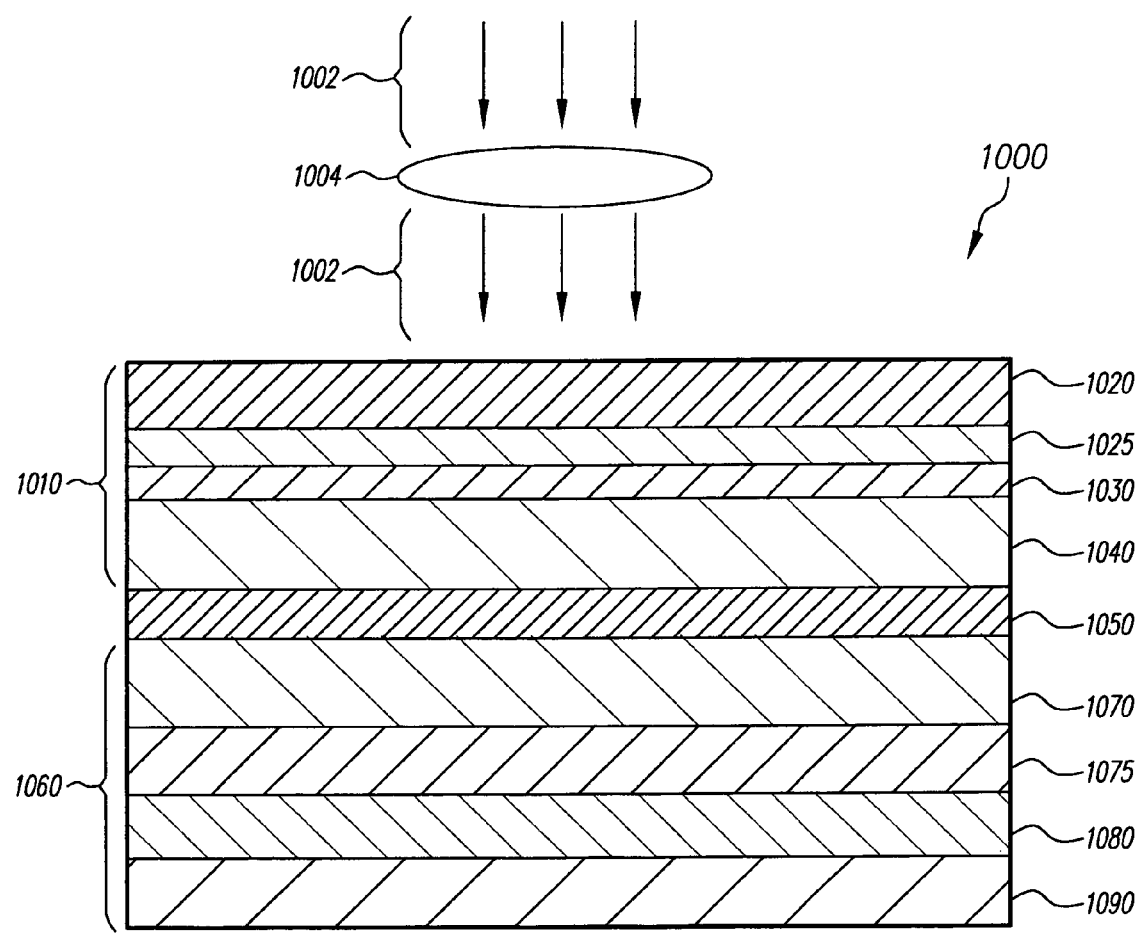
FIG. 14 shows a diagrammatic view of a dual-screen digital radiography flat-panel imager with an X-ray filter in accordance with an exemplary embodiment of the present invention for single-exposure dual energy imaging.

FIG. 14 illustrates another embodiment of the present invention. As shown, X-rays 1002 are directed through object 1004 towards digital radiography imager 1000 (in front-front configuration) to form an image. Digital radiography imager 1000 has front panel 1010 (in front screen configuration) and back panel 1060 (in front screen configuration) separated by filter 1050, where filter 1050 can be a metal material such as Al, Ti, V, Cr, Fe, Co, Ni, Cu, Zn, Zr, Nb, Mo, Ag, Cd, Sn, Ba, W, Ta, Au, Pb, or combinations thereof. Front panel 1010 has first scintillating phosphor layer 1020, passivation layer 1025, first array of signal sensing elements and readout devices 1030, substrate 1040, any other suitable layer, or any combinations thereof. Back panel 1060 has second scintillating phosphor layer 1070, passivation layer 1075, second array of signal sensing elements and readout devices 1080, substrate 1090, any other suitable layer, or any combinations thereof.

Second scintillating phosphor layer 1070 preferably has a thickness which is greater than or equal to the thickness of first scintillating phosphor layer 1020. First scintillating phosphor layer 1020 in front panel 1010 can have a phosphor (such as $Y_2O_2S$, BaFBr, any material listed in Table 3 above, or any other suitable combinations) to absorb the low-energy X-rays and second scintillating phosphor layer 1070 in back panel 1060 contains a phosphor (such as $Gd_2O_2S$, any material listed in Table 3 above, or any other suitable material) having enhanced high-energy X-ray absorption. In a preferred embodiment of the invention, second scintillating phosphor layer 1070 is thick enough to absorb most, if not all, the X-rays incident on it. Filter 1050 also can be used to further harden the beam incident on the high-Z phosphor screen (second scintillating phosphor layer 1070).

The operation of digital radiography imager 1000 is similar to the above-described embodiments. In digital radiography imager 1000, first scintillating phosphor layer 1020 is responsive to X-rays 1002 passing through object 1004 and produces light which illuminates the signal sensing elements of first array of signal sensing elements and readout devices 1030 to provide signals representing a first X-ray image. Second scintillating phosphor layer 1070 is responsive to X-rays passing through object 1004 and front panel 1010 to produce light which illuminates the signal elements of second array of signal sensing elements and readout devices 1080 to provide signals representing a second X-ray image. These signals of the first and second X-ray images can be combined to produce a composite X-ray image. Additional techniques can be also incorporated in the aforementioned exemplary embodiments of the single-exposure dual energy digital radiography apparatus, illustrated in FIGS. 8-14, such as: (1) the use of a pre-patient filter made of a high-atomic number material (e.g., Z=46 (Pd) to Z=79 (Au), or any suitable combinations thereof) to increase the energy separation between the low-energy (front screen) and high-energy (back screen) images; or (2) the use of a post-patient conventional anti-scatter grid to suppress scatter and algorithms to subtract scatter from the low- and high-energy images before subtraction processing.

The single-exposure dual energy digital radiography apparatus, such as those set forth in the exemplary embodiments above, can have various advantages over apparatus described in the prior art apparatus. These exemplary embodiments do not require switching of the X-ray tube voltage as required by the prior art apparatus, would have a reduction of patient motion misregistration artifacts, and would have lower X-ray tube loading as well as lower X-ray exposure on the patient. Furthermore, these exemplary embodiments can have higher detector performance in spatial resolution and signal-to-noise ratio, thus yielding higher image quality. Such imaging advantages can subsequently improve detection and characterization of diseases through dual energy imaging. Moreover, better integration of dual energy imaging into the current clinical workflow can providing higher operation efficiency, without the needs of digitizing the film images (SF apparatus), scanning the imaging plates (CR apparatus), and double exposure on the patient (dual-exposure DR apparatus).

The invention has been described in detail with particular reference to certain preferred embodiments thereof, but it will be understood that variations and modifications can be effected within the spirit and scope of the invention.

PARTS LIST 10 a-Si based flat panel imager
12 Phosphor screen
14 Passivation layer
16 Indium tin oxide layer
18 p-doped a-Si layer
20 a-Si:H layer
22 n-doped a-Si layer
24 Metal layer
26 Dielectric layer
28 Glass substrate
30 X-ray photon path
32 Visible light photon path
40 Screen-film apparatus
42 X-ray photon path
44 Front screen
46 Front emulsion layer
48 Anti-crossover layer
50 Film support layer
52 Anti-crossover layer
54 Back emulsion layer
56 Back screen
60 Dual-screen computed radiography imaging apparatus
62 Front Screen
64 Back Screen
66 X-rays
68 Patient
70 Photodiodes
71 Thin film transistors (TFT)
80 a-Si based flat panel imager
81 Sensor array
82 Gate drivers
83 Gate lines
84 Data lines
85 Bias lines
86 Charge amplifiers
87 Multiplexer
88 Analog-to-digital converter (ADC)
89 Correlated double sampling (CDS) circuitry
90 Computer
91 Monitor
92 Printer
93 Memory
94 Control logic
100 Digital radiography imager
102 X-rays
104 Object
110 Front panel
120 First scintillating phosphor layer
125 Passivation layer
130 First array of signal sensing elements and readout devices
140 Substrate
150 Filter
160 Back panel
170 Second scintillating phosphor layer
175 Passivation layer
180 Second array of signal sensing elements and readout devices
190 Substrate
200 Digital radiography imager
202 X-rays
204 Object
210 Front panel
220 First scintillating phosphor layer
225 Passivation layer
230 First array of signal sensing elements and readout devices
240 Substrate
250 Filter
260 Back panel
270 Substrate
280 Second array of signal sensing elements and readout devices
285 Passivation layer
290 Second scintillating phosphor layer
300 Digital radiography imager
302 X-rays
304 Object
310 Front panel
320 Substrate
330 First array of signal sensing elements and readout devices
335 Passivation layer
340 First scintillating phosphor layer
350 Filter
360 Back panel
370 Second scintillating phosphor layer
375 Passivation layer
380 Second array of signal sensing elements and readout devices 390 Substrate
400 Digital radiography imager
402 First scintillating phosphor layer
404 Passivation layer
406 First array of signal sensing elements and readout devices
408 Second array of signal sensing elements and readout devices
416 Crossover reducing layer
418 Substrate
420 Second scintillating phosphor layer
500 Digital radiography imager
502 X-rays
504 Object
510 Front panel
520 First scintillating phosphor layer
525 Passivation layer
530 First array of signal sensing elements and readout devices
540 Substrate
550 Filter
560 Back panel
570 Second scintillating phosphor layer
575 Passivation layer
580 Second array of signal sensing elements and readout devices
590 Substrate
600 Digital radiography imager
602 X-rays
604 Object
610 Front panel
620 First scintillating phosphor layer
625 Passivation layer
630 First array of signal sensing elements and readout devices
640 Substrate
650 Filter
660 Back panel
670 Substrate
680 Second array of signal sensing elements and readout devices
685 Passivation layer
690 Second scintillating phosphor layer
700 Digital radiography imager
702 X-rays
704 Object
710 Front panel
720 Substrate
730 First array of signal sensing elements and readout devices
735 Passivation layer
740 First scintillating phosphor layer
750 Filter
760 Back panel
770 Second scintillating phosphor layer
775 Passivation layer
780 Second array of signal sensing elements and readout devices
790 Substrate
800 Digital Radiography imager
802 First scintillating phosphor layer
804 Passivation layer
806 First array of signal sensing elements and readout devices
808 Second array of signal sensing elements and readout devices
816 Substrate
818 Second scintillating phosphor layer
900 Digital Radiography imager
902 X-rays
904 Object
910 Front panel
920 First scintillating phosphor layer
925 Passivation layer
930 First array of signal sensing elements and readout devices
940 Substrate
950 Back panel
960 Second scintillating phosphor layer
965 Passivation layer
970 Second array of signal sensing elements and readout devices
980 Substrate
1000 Digital radiography imager
1002 X-rays
1004 Object
1010 Front panel
1020 First scintillating phosphor layer
1025 Passivation layer
1030 First array of signal sensing elements and readout devices
1040 Substrate
1050 Filter
1060 Back panel
1070 Second scintillating phosphor layer
1075 Passivation layer
1080 Second array of signal sensing elements and readout devices
1090 Substrate
1100 Digital radiography imager
1102 X-rays
1104 Object
1110 Front panel
1120 Substrate
1130 First array of signal sensing elements and readout devices
1135 Passivation layer
1140 First scintillating phosphor layer
1150 Filter
1160 Back panel
1170 Substrate
1180 Second array of signal sensing elements and readout devices
1185 Passivation layer
1190 Second scintillating phosphor layer
1200 Digital radiography imager
1202 X-rays
1204 Object
1210 Front panel
1220 Substrate
1230 First array of signal sensing elements and readout devices
1235 Passivation layer
1240 First scintillating phosphor layer
1250 Filter
1260 Back panel
1270 Substrate
1280 Second array of signal sensing elements and readout devices
1285 Passivation layer
1290 Second scintillating phosphor layer

The invention claimed is:

1. A radiographic imaging apparatus for capturing X-ray images of an object, comprising:
a first scintillating phosphor layer having a first thickness responsive to X-rays passing through the object to produce light;
a first array of signal sensing elements and readout devices disposed under the first scintillating phosphor layer which receives illumination from the first scintillating phosphor layer, wherein the first signal sensing elements provide signals representing a first X-ray image;

a first crossover reducing layer disposed under the first array of signal sensing elements and readout devices;

a single substrate disposed under the first crossover reducing layer, the substrate having first and second surfaces and the first crossover reducing layer being formed on the first surface;

a second crossover reducing layer disposed under the substrate and being formed on the second surface of the substrate;

a second array of signal sensing elements and readout devices disposed under the second crossover reducing layer, opposite to the substrate;

a second scintillating phosphor layer disposed under the second array, having a second thickness responsive to X-rays passing through the object and all the layers above the second scintillating phosphor layer to produce light which illuminates the second signal sensing elements to thereby provide signals representing a second X-ray image;

means for variably combining the signals of the first and second X-ray images to produce a plurality of composite X-ray images; and the composition and thickness of the first and second scintillating phosphor layers being selected, relative to each other, along with the combined signals to enable selection of a single image of the plurality of composited images with an improved detective quantum efficiency.

2. The apparatus of claim 1, further having a dielectric layer disposed under the first array of signal sensing elements and readout devices, disposed under the substrate, or disposed under the second crossover reducing layer, or combinations thereof.

3. The apparatus of claim 1, wherein the first and second crossover reducing layers are hydrophilic colloid layers having gelatin and microcrystalline crossover reducing dyes to reduce crossover of light between the first scintillating phosphor layer and the second scintillating phosphor layer to less than 10 percent.

4. The apparatus of claim 1, wherein at least one of the first scintillating phosphor layer and the second scintillating phosphor layer includes $Gd_2O_2S:Tb$, $Gd_2O_2S:Eu$, $Gd_2O_3:Eu$, $La_2O_2S:Tb$, $La_2O_2S$, $Y_2O_2S:Tb$, $CsI:Tl$, $CsI:Na$, $CsBr:Tl$, $NaI:Tl$, $CaWO_4$, $CaWO_4:Tb$, $BaFBr:Eu$, $BaFCl:Eu$, $BaSO_4:Eu$, $BaSrSO_4$, $BaPbSO_4$, $BaAl_{12}O_{19}:Mn$, $BaMgAl_{10}O_{17}:Eu$, $Zn_2SiO_4:Mn$, $(Zn,Cd)S:Ag$, $LaOBr$, $LaOBr:Tm$, $Lu_2O_2S:Eu$, $Lu_2O_2S:Tb$, $LuTaO_4$, $HfO_2:Ti$, $HfGeO_4:Ti$, $YTaO_4$, $YTaO_4:Gd$, $YTaO_4:Nb$, $Y_2O_3:Eu$, $YBO_3:Eu$, $YBO_3:Tb$, or $(Y,Gd)BO_3:Eu$, or combinations thereof.

5. The apparatus of claim 1, wherein the second scintillating phosphor layer has a thickness that is greater than or equal to the thickness of the first scintillating phosphor layer.

6. The apparatus of claim 1, wherein the substrate includes borosilicate glass, aluminosilicate glass, fusion-formed glass, plastic capable of transmitting or blocking light, metal, or alloy, wherein the metal or alloy includes Al, Ti, V, Cr, Fe, Co, Ni, Cu, Zn, Zr, Nb, Mo, Ag, Cd, Sn, Ba, W, Ta, Au, or Pb, or combinations thereof.

7. The apparatus of claim 1, wherein the first scintillating phosphor layer and the second scintillating phosphor layer absorb low-energy component and high-energy component X-ray radiation, wherein the amount of low-energy component X-ray radiation absorbed by the first scintillating phosphor layer is greater than the amount of high-energy component X-ray radiation, and wherein the amount of high-energy component X-ray radiation absorbed by the second scintillating phosphor layer is greater than the amount of low-energy component X-ray radiation.

8. A radiographic imaging apparatus for taking X-ray images of an object, comprising:

a first scintillating phosphor layer having a first thickness responsive to X-rays passing through the object to produce light;

a first array of signal sensing elements and readout devices disposed under the first scintillating phosphor layer which receives illumination from the first scintillating phosphor layer, wherein the first signal sensing elements provide signals representing a first X-ray image;

a single substrate having first and second surfaces;

a crossover reducing layer formed on one of the first and second surface of the substrate to provide a crossover-substrate result, the crossover-substrate result disposed under the first array of signal sensing elements and readout devices;

a second array of signal sensing elements and readout devices disposed under the crossover-substrate result, opposite to the first array of signal sensing elements and readout devices;

a second scintillating phosphor layer disposed under the second array of signal sensing elements and readout devices, having a second thickness responsive to X-rays passing through the object and all the layers above the second scintillating phosphor layer to produce light which illuminates the second signal sensing elements to thereby provide signals representing a second X-ray image;

means for variably combining the signals of the first and second X-ray images to produce a plurality of composite X-ray images; and the composition and thickness of the first and second scintillating phosphor layers being selected, relative to each other, along with the combined signals to enable selection of a single image of the plurality of composited images with an improved detective quantum efficiency.

* * * * *